(12) United States Patent
Guha

(10) Patent No.: US 7,743,045 B2
(45) Date of Patent: Jun. 22, 2010

(54) DETECTING SPAM RELATED AND BIASED CONTEXTS FOR PROGRAMMABLE SEARCH ENGINES

(75) Inventor: Ramanathan V. Guha, Los Altos, CA (US)

(73) Assignee: Google Inc., Mountain View, CA (US)

(*) Notice: Subject to any disclaimer, the term of this patent is extended or adjusted under 35 U.S.C. 154(b) by 423 days.

(21) Appl. No.: 11/202,382

(22) Filed: Aug. 10, 2005

(65) Prior Publication Data

US 2007/0038600 A1 Feb. 15, 2007

(51) Int. Cl.
*G06F 17/30* (2006.01)
(52) U.S. Cl. .......................... 707/706; 707/705; 705/1; 705/14; 715/205; 709/217
(58) Field of Classification Search .............. 707/3–5, 707/1
See application file for complete search history.

(56) References Cited

U.S. PATENT DOCUMENTS

| 5,659,766 | A | * | 8/1997 | Saund et al. .................. 704/9 |
| 5,724,521 | A | | 3/1998 | Dedrick |
| 5,752,238 | A | | 5/1998 | Dedrick |
| 5,754,938 | A | | 5/1998 | Herz et al. |
| 5,754,939 | A | | 5/1998 | Herz et al. |
| 5,794,210 | A | | 8/1998 | Goldhaber et al. |
| 5,809,242 | A | | 9/1998 | Shaw et al. |
| 5,848,396 | A | | 12/1998 | Gerace |
| 5,855,008 | A | | 12/1998 | Goldhaber et al. |
| 5,878,429 | A | | 3/1999 | Morris et al. |
| 5,887,133 | A | | 3/1999 | Brown et al. |
| 5,933,811 | A | | 8/1999 | Angles et al. |
| 5,948,061 | A | | 9/1999 | Merriman et al. |
| 5,974,398 | A | | 10/1999 | Hanson et al. |
| 5,991,735 | A | | 11/1999 | Gerace |
| 6,134,532 | A | | 10/2000 | Lazarus et al. |
| 6,144,944 | A | | 11/2000 | Kurtzman, II et al. |

(Continued)

FOREIGN PATENT DOCUMENTS

WO WO 97/17774 A1 5/1997

(Continued)

OTHER PUBLICATIONS

Acey, M., "Web Ads That Hit the Button," Internet Daily Europe, May 10, 2001, [online] Retrieved from the Internet: <URL: http://www.vibrantmedia.co.uk/press/FTMarketwatch.htm>.

(Continued)

*Primary Examiner*—Don Wong
*Assistant Examiner*—Sheree N Brown
(74) *Attorney, Agent, or Firm*—Fish & Richardson P.C.

(57) ABSTRACT

A programmable search engine system is programmable by a variety of different entities, such as client devices and vertical content sites to customize search results for users. Context files store instructions for controlling the operations of the programmable search engine. The context files are processed by various context processors, which use the instructions therein to provide various pre-processing, post-processing, and search engine control operations. Spam related and biased contexts and search results are identified using offline and query time processing stages, and the context files from vertical content providers associated with such spam and biased context and results are excluded from processing on direct user queries.

21 Claims, 11 Drawing Sheets

U.S. PATENT DOCUMENTS

| | | | |
|---|---|---|---|
| 6,182,050 B1 | 1/2001 | Ballard | |
| 6,195,698 B1* | 2/2001 | Lillibridge et al. | |
| 6,199,067 B1 | 3/2001 | Geller | |
| 6,216,112 B1 | 4/2001 | Fuller et al. | |
| 6,243,375 B1 | 6/2001 | Speicher | |
| 6,253,189 B1 | 6/2001 | Feezell et al. | |
| 6,269,361 B1 | 7/2001 | Davis et al. | |
| 6,279,036 B1 | 8/2001 | Himmel et al. | |
| 6,285,987 B1 | 9/2001 | Roth et al. | |
| 6,285,999 B1 | 9/2001 | Page | |
| 6,308,202 B1 | 10/2001 | Cohn et al. | |
| 6,324,519 B1 | 11/2001 | Eldering | |
| 6,327,574 B1 | 12/2001 | Kramer et al. | |
| 6,334,109 B1 | 12/2001 | Kanevsky et al. | |
| 6,338,066 B1 | 1/2002 | Martin et al. | |
| 6,343,274 B1 | 1/2002 | McCollom et al. | |
| 6,356,898 B2 | 3/2002 | Cohen et al. | |
| 6,360,221 B1 | 3/2002 | Gough et al. | |
| 6,366,298 B1 | 4/2002 | Haitsuka et al. | |
| 6,366,956 B1 | 4/2002 | Krishnan | |
| 6,385,592 B1 | 5/2002 | Angles et al. | |
| 6,401,075 B1 | 6/2002 | Mason et al. | |
| 6,449,657 B2* | 9/2002 | Stanbach, Jr. et al. | |
| 6,460,034 B1* | 10/2002 | Wical | |
| 6,487,538 B1* | 11/2002 | Gupta et al. | |
| 6,505,196 B2* | 1/2003 | Drucker et al. | |
| 6,519,571 B1* | 2/2003 | Guheen et al. | |
| 6,526,403 B1 | 2/2003 | Lin et al. | |
| 6,584,492 B1* | 6/2003 | Cezar et al. | |
| 6,665,656 B1* | 12/2003 | Carter | |
| 6,665,838 B1* | 12/2003 | Brown et al. | 715/205 |
| 6,681,223 B1* | 1/2004 | Sundaresan | 707/6 |
| 6,704,729 B1 | 3/2004 | Klein et al. | |
| 6,721,713 B1* | 4/2004 | Guheen et al. | 705/1 |
| 6,772,200 B1* | 8/2004 | Bakshi et al. | 709/217 |
| 6,804,659 B1* | 10/2004 | Graham et al. | 705/14.49 |
| 6,892,181 B1* | 5/2005 | Megiddo et al. | 705/14.41 |
| 6,892,354 B1* | 5/2005 | Servan-Schreiber et al. | 715/733 |
| 7,013,323 B1 | 3/2006 | Thomas et al. | |
| 7,136,875 B2 | 11/2006 | Anderson | |
| 7,346,606 B2 | 3/2008 | Bharat | |
| 7,346,839 B2* | 3/2008 | Acharya et al. | |
| 7,349,901 B2* | 3/2008 | Ramarathnam et al. | |
| 7,509,344 B1 | 3/2009 | Kamvar | |
| 2001/0014868 A1 | 8/2001 | Herz et al. | |
| 2001/0032252 A1 | 10/2001 | Durst, Jr. et al. | |
| 2002/0049635 A1 | 4/2002 | Mai et al. | |
| 2002/0053078 A1 | 5/2002 | Holtz et al. | |
| 2002/0073079 A1* | 6/2002 | Terheggen | |
| 2002/0078045 A1 | 6/2002 | Dutta | |
| 2002/0087535 A1 | 7/2002 | Kotcheff et al. | |
| 2002/0103834 A1* | 8/2002 | Thompson et al. | 707/526 |
| 2002/0112035 A1 | 8/2002 | Carey et al. | |
| 2002/0123912 A1* | 9/2002 | Subramanian et al. | |
| 2002/0165849 A1* | 11/2002 | Singh et al. | |
| 2002/0169760 A1* | 11/2002 | Cheung et al. | |
| 2003/0040959 A1* | 2/2003 | Fei et al. | |
| 2003/0046161 A1 | 3/2003 | Kamangar | |
| 2003/0055831 A1* | 3/2003 | Ryan et al. | 707/100 |
| 2003/0101182 A1 | 5/2003 | Govrin | |
| 2003/0149937 A1* | 8/2003 | McElfresh et al. | |
| 2004/0044571 A1 | 3/2004 | Bronnimann et al. | |
| 2004/0059708 A1* | 3/2004 | Dean et al. | 707/1 |
| 2004/0059712 A1* | 3/2004 | Dean et al. | 707/1 |
| 2004/0068527 A1* | 4/2004 | Smith, III | 707/204 |
| 2004/0073485 A1* | 4/2004 | Liu et al. | 705/14 |
| 2004/0093327 A1* | 5/2004 | Anderson et al. | 707/3 |
| 2004/0210639 A1* | 10/2004 | Ben-Yoseph et al. | 709/206 |
| 2004/0249709 A1* | 12/2004 | Donovan et al. | 705/14 |
| 2005/0021397 A1 | 1/2005 | Cui | |
| 2005/0022114 A1 | 1/2005 | Shanahan | |
| 2005/0050027 A1 | 3/2005 | Yeh | |
| 2005/0050097 A1 | 3/2005 | Yeh | |
| 2005/0065844 A1 | 3/2005 | Raj | |
| 2005/0071741 A1* | 3/2005 | Acharya et al. | |
| 2005/0076014 A1 | 4/2005 | Agarwal | |
| 2005/0080772 A1* | 4/2005 | Bem | 707/3 |
| 2005/0114198 A1 | 5/2005 | Konigstein | |
| 2005/0131762 A1 | 6/2005 | Bharat | |
| 2005/0131935 A1 | 6/2005 | O'Leary | |
| 2005/0160107 A1 | 7/2005 | Liang | |
| 2005/0222901 A1 | 10/2005 | Agarwal | |
| 2005/0240580 A1 | 10/2005 | Zamir et al. | |
| 2005/0256866 A1* | 11/2005 | Lu et al. | 707/5 |
| 2005/0256867 A1* | 11/2005 | Walther et al. | |
| 2005/0278321 A1* | 12/2005 | Vailaya et al. | 707/3 |
| 2006/0004748 A1* | 1/2006 | Ramarathnam et al. | |
| 2006/0026013 A1 | 2/2006 | Kraft | |
| 2006/0026147 A1 | 2/2006 | Cone et al. | |
| 2006/0069616 A1 | 3/2006 | Bau | |
| 2006/0080321 A1* | 4/2006 | Horn et al. | 707/10 |
| 2006/0085750 A1 | 4/2006 | Easton et al. | |
| 2006/0095416 A1* | 5/2006 | Barkhin et al. | 707/3 |
| 2006/0122957 A1 | 6/2006 | Chen | |
| 2006/0149624 A1 | 7/2006 | Baluja | |
| 2006/0167857 A1 | 7/2006 | Kraft et al. | |
| 2006/0184500 A1* | 8/2006 | Najork et al. | |
| 2006/0218146 A1* | 9/2006 | Bitan et al. | |
| 2006/0242147 A1 | 10/2006 | Gehrking | |
| 2006/0248072 A1* | 11/2006 | Brewer et al. | 707/5 |
| 2007/0038601 A1 | 2/2007 | Guha | |
| 2007/0038603 A1 | 2/2007 | Guha | |
| 2007/0038614 A1 | 2/2007 | Guha | |
| 2007/0038616 A1 | 2/2007 | Guha | |
| 2007/0055642 A1* | 3/2007 | Kim et al. | |
| 2008/0005064 A1* | 1/2008 | Sarukkai | 707/3 |
| 2008/0170260 A1 | 7/2008 | Haller et al. | |

FOREIGN PATENT DOCUMENTS

| | | |
|---|---|---|
| WO | WO 97/26729 A2 | 7/1997 |
| WO | WO 00/57333 A2 | 9/2000 |
| WO | WO 01/01217 A2 | 1/2001 |
| WO | WO 01/44992 A1 | 6/2001 |
| WO | WO 01/63472 A2 | 8/2001 |

OTHER PUBLICATIONS

Aggarwal, C.C. et al., "A Framework for the Optimizing of WWW Advertising," International IFIP Working Conference on Electronic Commerce, Trends in Distributed Systems for Electronic Commerce, Springer-Verlag Lecture Notes in Computer Science, 1998, pp. 1-10, vol. 1402.

Eads, S., "One Biz Owner Auctions Prime Web Ad Space to Other Owners," Frontier Advice & Columns, Nov. 18, 1998, 4 pages, [online] [Retrieved on Jun. 17, 2004] Retrieved from the Internet: <URL: http://www.businessweek.com/smallbiz/news/coladvice/reallife/rl981118.htm?scriptFramed>.

Gallagher, K. et al., "Framework for Targeting Banner Advertising on the Internet," 30th Hawaii International Conference on System Sciences (HICSS) vol. 4: Information Systems Track—Internet and the Digital Economy, p. 265, Jan. 3-6, 1997, 1 page, [online] [Retrieved on Jun. 17, 2004] Retrieved from the Internet<URL:http://esdl.computer.org/comp/proceedings/hicss/1997/7734/04/7734040265abs.htm>.

Gallagher, K. et al., "A Framework for Targeting Banner Advertising on the Internet," IEEE, 1997, pp. 265-274.

Kohda, Y. et al., "Ubiquitous Advertising on the WWW: Merging Advertisement on the Browser," Fifth International World Wide Web Conference, May 6-10, 1996, 9 pages, [online] [Retrieved on May 12, 2004] Retrieved from the Internet: <URL: http:www5conf.inria.fr.fich_html.papers/P52/Overview . . . >.

Langheinrich, M. et al., "Unintrusive Customization Techniques for Web Advertising," Computer Networks, 1999, pp. 1259-1272, vol. 31, No. 11-16.

Leonard, H.B., "Elicitation of Honest Preferences for the Assignment of Individuals to Positions," Journal of Politic al Economy, 1983, pp. 461-479, vol. 91, No. 3.

Lucking-Reiley, D., "Vickrey Auctions in Practice: From Nineteenth-Century Philately to Twenty-First-Century E-Commerce," Journal of Economic Perspectives, Summer 2000, pp. 183-192, vol. 14, No. 3.

Lui, F.T., "An Equilibrium Queuing Model of Bribery," The Journal of Political Economy, Aug. 1985, pp. 760-781, vol. 93, Issue 4.

Matthews, J., "Automating Ad Intelligence" Silicon Valley Internet.com, Jul. 24, 2000, 4 pages, [online] [Retrieved on May 12, 2004] Retrieved from the Internet: <URL: http://siliconvalley.internet.com/news/article.php/3531 . . . >.

McCandless, M., "Web Advertising," IEEE Intelligent Systems, May/Jun. 1998, 3 pages, vol. 13, No. 3, [online] [Retrieved on Jun. 17, 2004] Retrieved from the Internet: <URL: http://esdl.computer.org/comp/mags/ex/1998/03/x3008abs.htm>.

"New Service Puts Ad Auction, Search Engine Under One Roof," Electronic Advertising & Marketplace Report, Simba Information Inc., Apr. 28, 1998, 2 pages.

Ng, V., "An Intelligent Agent for Web Advertisements," Institute of Electrical and Electronics Engineers, Inc., Apr. 23-24, 2001, p. 102, [online] [Retrieved on Jun. 17, 2004] Retrieved from the Internet: <URL: http://esdl.computer.org/comp/proceedings/codas/2001/1128/00/11280102abs.htm>.

Ng, V., "An Intelligent Agent for Web Advertisements," IEEE, 2001, pp. 102-109.

"Overture Reports Strong Second Quarter 2002 Results; Company Announces Fourth Consecutive Quarter of Profitability," Archived Press Releases, Overture Services Inc., Jul. 25, 2002, 9 pages.

Reynolds, K., Auctions—The Vickrey Auction (Uniform Second-Price), 1996, 3 pages, [online] [Retrieved on Jun. 17, 2004] Retrieved from the Internet: <URL: http://wwww.agorics.com/Library/Auctions/auction5.html>.

Riordan, T., "Aiming Web Ads More Effectively," The New York Times on the Web, Dec. 7, 1998, 4 pages, [online] [Retrieved on Jun. 17, 2004] Retrieved from the Internet: <URL: http://www.nytimes.com/library/tech/98/12/biztech/articles/07patents.html>.

Rosenstein, M. et al., "Recommending from Content: Preliminary Results from an E-Commerce Experiment," Telcordia Technologies, Inc., 1999, 2 pages.

Siew, D., "Agent-Mediated Internet Advertising," Second International Workshop on Advance Issues of E-Commerce and Web-Based Information Systems (WECWIS 2000), Jun. 8-9, 2000, p. 102, [online] [Retrieved on Jun. 17, 2004] Retrieved from the Internet: <URL: http://esdlcomputer.org/comp/proceedings/weewis/2000/0610/00/06100102abs.htm>.

Yager, R.R., "Targeted E-Commerce Marketing Using Fuzzy Intelligent Agents," IEEE Xplore, Release 1.4, Nov./Dec. 2000, 2 pages, [online] [Retrieved on Feb. 25, 2003] Retrieved from the Internet: <URL: http://search.ieeexplore.ieee.org/search97/is.vts?actionView>.

Yager, R.R., "Targeted E-Commerce Marketing Using Fuzzy Intelligent Agents," IEEE Intelligent Systems, 2000, pp. 42-45.

* cited by examiner

DETECTING SPAM RELATED AND BIASED CONTEXTS FOR PROGRAMMABLE SEARCH ENGINES

CROSS REFERENCE TO RELATED APPLICATIONS

This application is related to the following patent applications, the disclosures of which are incorporated herein by reference:

U.S. patent application Ser. No. 11/202,423, filed on Aug. 10, 2005, for "Programmable Search Engine";

U.S. patent application Ser. No. 11/202,410, filed on Aug. 10, 2005, for "Sharing Context Data Across Programmable Search Engines";

U.S. patent application Ser. No. 11/202,383, filed on Aug. 10, 2005, for "Aggregating Context Data for Programmable Search Engines";

U.S. patent application Ser. No. 11/201,754, filed on Aug. 10, 2005, for "Generating and Presenting Advertisements based on Context Data for Programmable Search Engines".

U.S. patent application Ser. No. 10/921,381, filed Aug. 18, 2004, for "Method for Detecting Link Spam in Hyperlinked Databases"; and U.S. patent application Ser. No. 11/004,250, filed Dec. 3, 2004, for "Method and System to Detect E-mail Spam Using Concept Categorization of Linked Content".

FIELD OF INVENTION

This invention relates in general to search engines, and more particularly, to search engines that are programmable by clients, hosts, and other devices and systems that make use of the search engine's services.

BACKGROUND OF INVENTION

The development of information retrieval systems has predominantly focused on improving the overall quality of the search results presented to the user. The quality of the results has typically been measured in terms of precision, recall, or other quantifiable measures of performance. Information retrieval systems, or 'search engines' in the context of the Internet and World Wide Web, use a wide variety of techniques to improve the quality and usefulness of the search results. These techniques address every possible aspect of search engine design, from the basic indexing algorithms and document representation, through query analysis and modification, to relevance ranking and result presentation, methodologies too numerous to fully catalog here.

Regardless of the particular implementation technique—the fundamental architectural assumption for search engines has that the search engine's operational model is fixed and non-alterable by entities external to the system itself. That is, the search engine operates essentially as a "black box", which receives a search query, processes the query using a complex, yet preprogrammed search algorithm and relevance ranking model, and provides the search results. Even where the details of the search algorithm are publicly disclosed, the search engine itself still operates only according to this algorithm, and nothing more.

An inherent problem in the design of search engines is that the relevance of search results to a particular user depends on factors that are highly dependent on the user's intent in conducting the search—that is why they are conducting the search—as well as the user's circumstances—the facts pertaining to the user's information need. Thus, given the same query by two different users, a given set of search results can be relevant to one user and irrelevant to another, entirely because of the different intent and information needs. Most attempts at solving the problem of inferring a user's intent typically depend on relatively weak indicators, such as static user preferences, or predefined methods of query reformulation that are nothing more than educated guesses about what the user is interested in based on the query terms. Approaches such as these cannot fully capture user intent because such intent is itself highly variable and dependent on numerous situational facts that cannot be extrapolated from typical query terms.

Consider, for example a user query for "Canon Digital Rebel", which is the name of a currently popular digital camera. From the query alone it is impossible to determine the user's intent, for example, whether the user is interested in purchasing such a camera, or whether the user owns this camera already and needs technical support, or whether the user is interested in comparing the camera with competitive offerings, or whether the user is interested in learning to use this camera. That is, the user's situational facts (e.g., whether or not they own the camera currently, their level of expertise in the subject area), and their information need (e.g., the type, form, level of detail, of the request information) cannot themselves be reliably determined by either analysis of query terms, or resort to previously stored preference data about the user.

Another method of inferring intent is the tracking and analysis of prior user queries to build a model of the user's interests. Thus, some search engines store search queries by individual users, and then attempt to determine the user's interests based on frequency of key words appearing in the search queries, as well as which search results the user accesses. One problem with this approach is the assumption that queries accurately reflect a user's interests, either short term or long term. Another is that it assumes that there is a direct and identifiable relationship between a given information need, say shopping for a digital camera, and the particular query terms used to find information relevant to that need. That assumption however is incorrect, as the same query terms can be used by the same (or different users) having quite different information needs.

Perhaps because in part of the inability of contemporary search engines to consistently find information that satisfies the user's information need, and not merely the user's query terms, users frequently turn to websites that offer highly specialized information about particular topics. These websites are typically constructed by individuals, groups, or organizations that have expertise in the particular subject area (e.g., knowledge about digital cameras). Such sites—referred to herein as vertical content sites—often include specifically created content that provides in-depth information about the topic, as well organized collections of links to other related sources of information. For example, a website devoted to digital cameras typically includes product reviews, guidance on how to purchase a digital camera, as well as links to camera manufacturer's sites, price comparison engines, other sources of expert opinion and the like. In addition, the domain experts often have considerable knowledge about which other resources available on the Internet are of value and which are not. Using his or her expertise, the content developer can at best structure the site content to address the variety of different information needs of users.

However, while such vertical content sites provide extensive useful information that the user can access to address a particular current information need, the problem remains that when the user returns to a general search engine to further search for relevant information, none of the expertise provided by the vertical content site is made available to the search engine. Many vertical content sites provide a search field from which the user can access a general search engine. This field is merely used to pass a user's search query back to the general search engine. However, none of the expertise that is expressed in the vertical content site is directly available to the general search engine as part of the user's query in order to provide more meaningful search results. The expert content developer has no formal, programmatic way of passing information to the general search engine that expresses their expertise in their particular knowledge site.

In other words, there are no contemporary search engines that can be programmed by external entities—such as vertical content sites—during the search process itself, in way that can enhance the search process with the expertise of the content developer of the vertical content site.

SUMMARY

A user's query is processed using context information that describes any combination of pre-processing operations (conducted prior to query execution) and post-processing operations (conducted on the search results from query execution). The pre-processing operations include operations to revise, modify or expand the query, to select one or more document collections on which to conduct the search, to set various search algorithm parameters for evaluating the query, or any other type of operation that can refine, improve, or otherwise enhance the quality of the user's search query.

The context processed query is then executed by a search engine to obtain a set of search results. The post-processing operations applied to the search results include operations to filter, organize, and annotate the search results as well as provide links to related contexts for other types of information or information needs. The context processing operations can be provided by a programmable search engine site, by a vertical content provider site, or by a client device. The context processing operations are controlled by context files that include commands, parameters, and instructions. The context files may be stored at the programmable search engine site, at various vertical content providers, or at client device. Context files from multiple different sources can be used jointly.

Context processing can also be limited to either pre-processing, or post-processing. The selection of which context files to apply to a given user query or a set of search results can be based on the query, the user, the client device, the vertical content site from which the query was received. The selection may be based as well on one or more subscriptions that a user has to particular vertical content providers, or popularity or reputation of a vertical content provider.

Spam related and biased context files, and their associated vertical content providers are also identified. An offline processing stage identifies spam related context files using a spam filter to evaluate various sites and pages selected by a vertical content provider for inclusion in its context files. The context files from vertical content providers identified as being spam related are excluded from usage during subsequent processing of user search queries directly received by the programmable search engine. A query time processing stage applies a spam filter to the search results from a context processed query. Search results that are identified as spam are excluded from the context processed search results provided to the user. In addition, other context related content, including links and annotations, from this spam related vertical content provided are also removed from the search results.

The query time processing stage also preferably includes a bias detection filter that identifies biased search results. The biased search results are identified by a distance measure between the search results from the context processed query, and native search results. Biased search results are also filtered from the results provided to the user.

The invention also has embodiments in computer program products, systems, user interfaces, and computer implemented methods for facilitating the described functions and behaviors.

The figures depict various embodiments of the present invention for purposes of illustration only. One skilled in the art will readily recognize from the following discussion that alternative embodiments of the illustrated and described structures, methods, and functions may be employed without departing from the principles of the invention.

DETAILED DESCRIPTION

Introduction to Programmable Search

Figure 1:
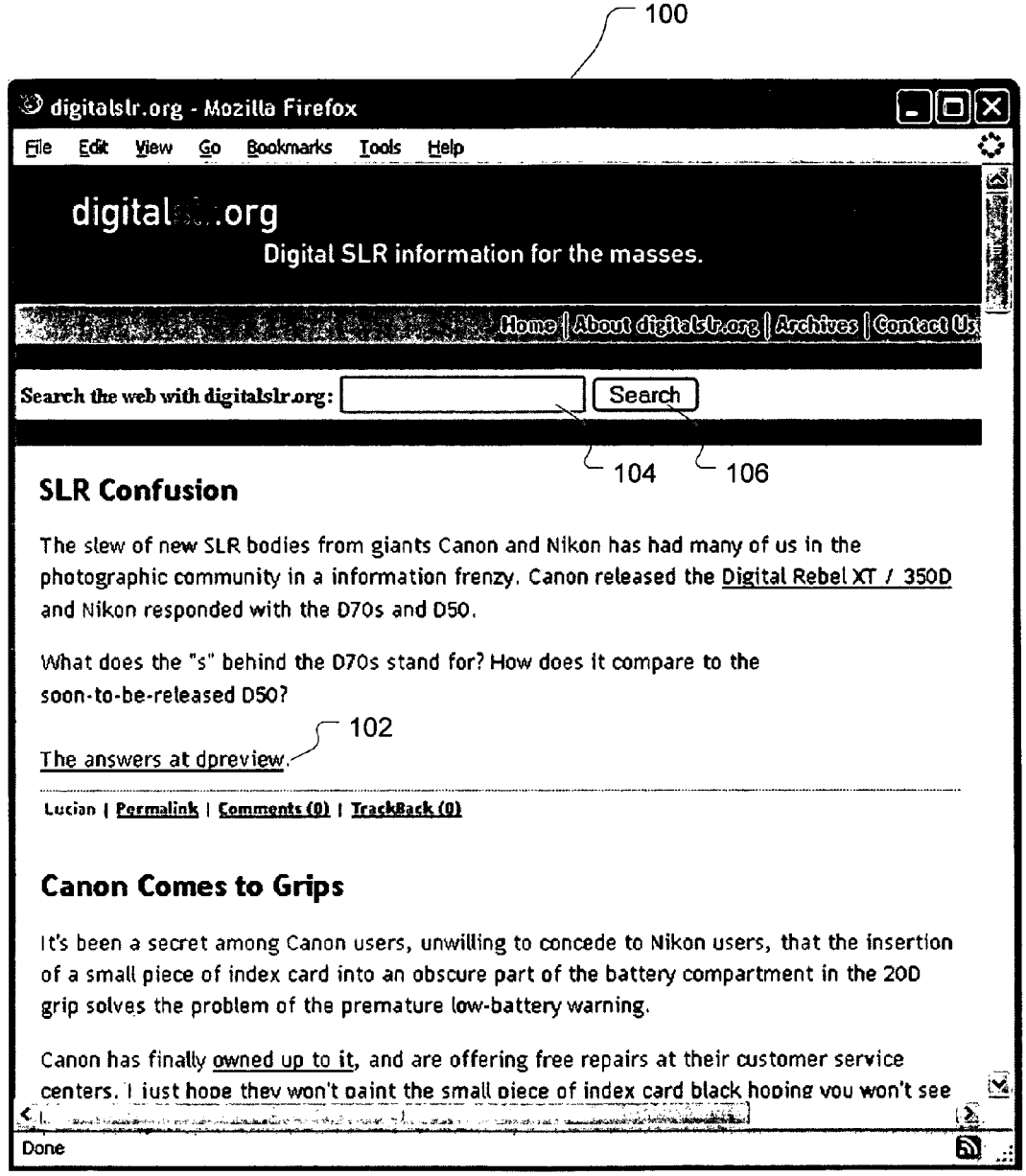
FIG. 1 illustrates a page from a host domain having a search field for accessing the programmable search engine.
Figure 2:
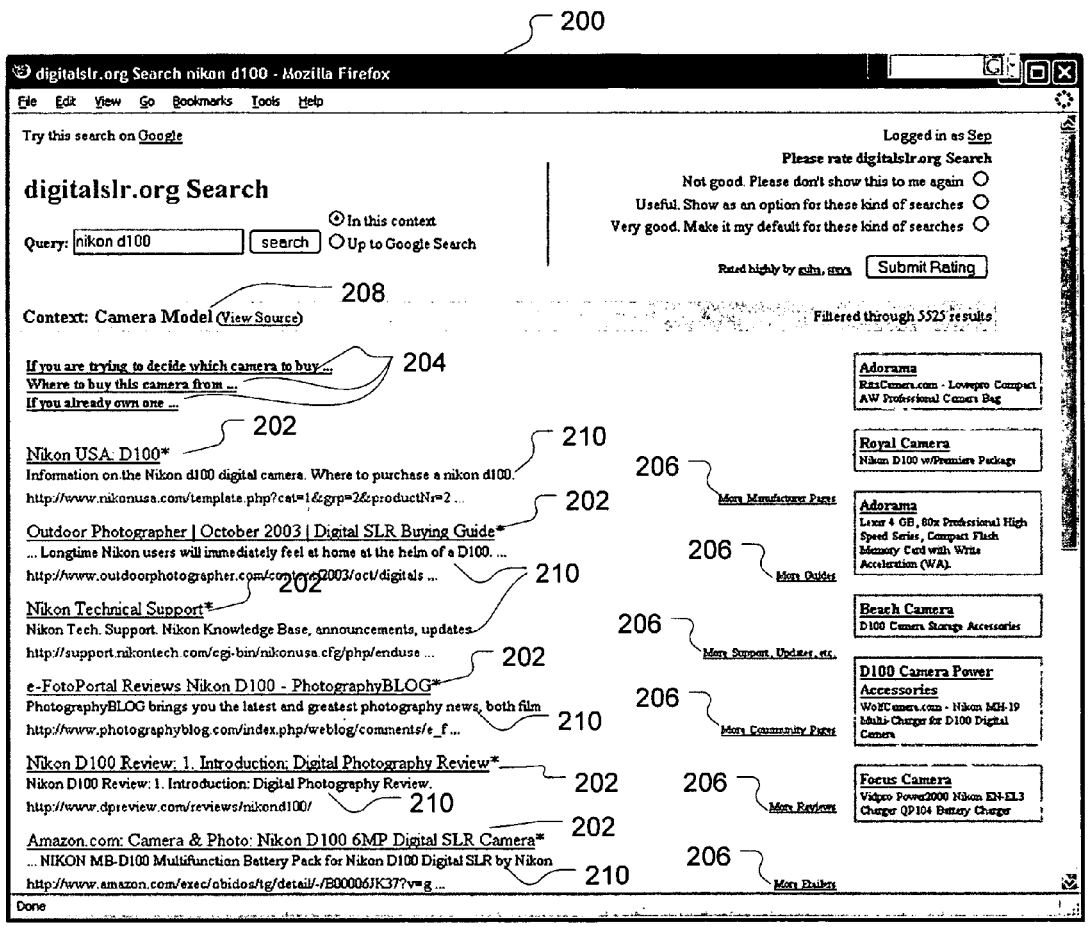
FIG. 2 illustrates the results of a search from the host domain.
Figure 3:
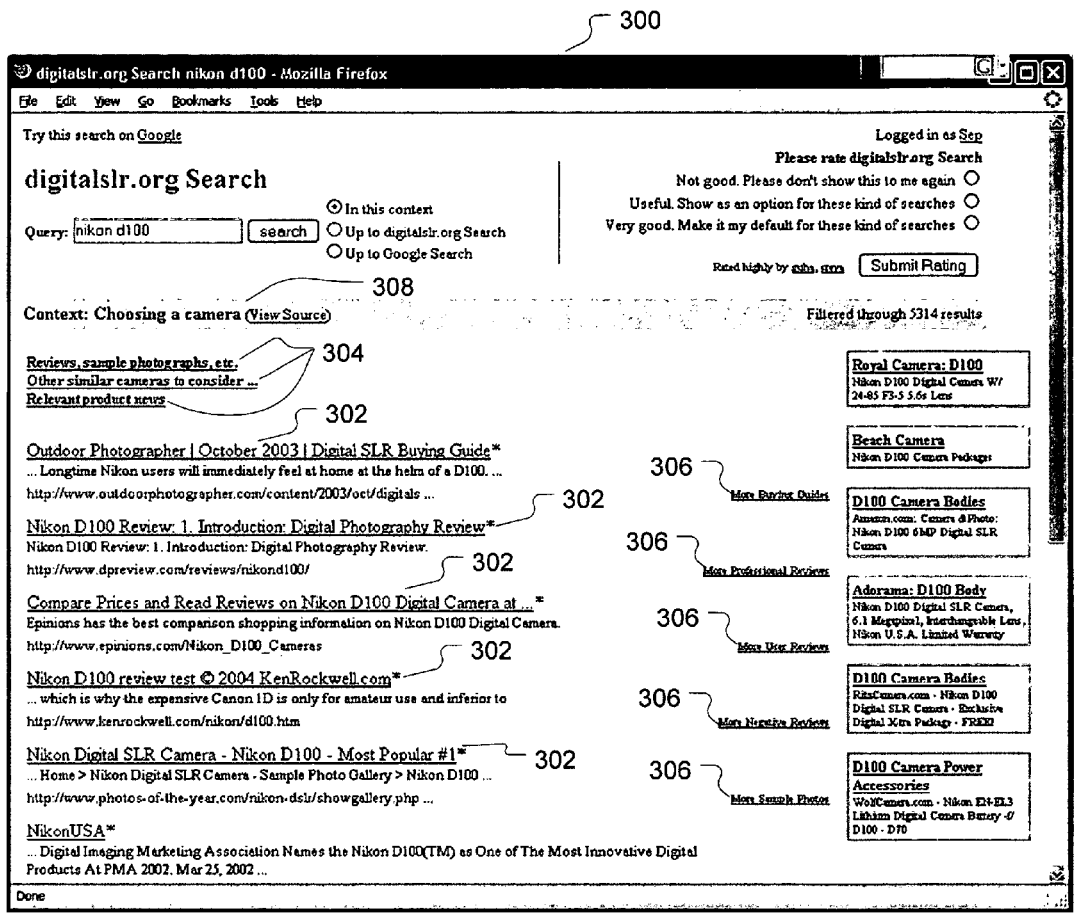
FIG. 3 illustrates a further page accessed from the search results page.

Referring now to FIGS. 1-3, there is shown an example of the user experience in using a programmable search system in accordance with an embodiment of the present invention. In FIG. 1 there is shown a page 100 from a host site, digitalslr.org, which is an example of a vertical content site, here the field of digital cameras, as its content and organization reflects the viewpoint and knowledge and of the entity that provides the site content. A vertical content site can be on any topic, and offer any type of information, and thus is not limited in that regard. For example, vertical content sites include sites on particular technologies or products (e.g., digital cameras or computers), political websites, blogs, community forums, news organizations, personal websites, industry associations, just to a name a few. What vertical content sites offer is a particular perspective and understanding of the world, one that may be of interest and value to some users. This perspective and understanding can be expressed, at least in part, by the content provider's organization and selection of content, as well as commentary, analysis or links to other content (e.g., commentary on other sites on the Internet). Indeed, one valuable aspect of vertical content sites is the particular collection of links to other sites that the content developer has judged to be useful in some regard, either for its depth, expertise, viewpoint, or the like. That is, users in general find value in the judgments of vertical content providers as to the usefulness of other sources of information on the Internet.

The host site includes a web server for serving pages, like page 100, to client devices. The pages are stored in some repository, such as a database, file directories, or the like. Thus, for example, the page 100 includes commentary on the latest camera offerings from various companies, as well as a link 102 to another site with relevant information about digital cameras. Of interest in this example is the search field 104, which allows the user to search the Internet using a general search engine system (not shown), such as the Google® search engine provided by Google, Inc. of Mountain View, Calif. (of course in other embodiments, other search engines may be used, even if they are not nearly as powerful and sophisticated as Google). The user enters a search query in the search field 104. Here, the query is "Nikon d100".

Selecting the search button 106 results in the web server transmitting the search query to the search engine system, using existing web protocols. In this example embodiment, in addition to the search query, the host site web server transmits a context file to the search engine system (alternatively, the web server can transmit a link to the context file, or simply a context file identifier). The context file includes data that the search engine system uses to control the operation of the search engine itself in processing the search query and in presenting the search results, in effect, programming the search engine's operation. Thus, the context file, as will be further detailed below, can be understood as a set of instructions to the search engine system for processing a particular search query. The instructions can control three aspects of the search process: 1) pre-query processing operations; 2) search engine control information; 3) post-query processing operations. Among other aspects, a context file may include descriptions of (or links to) related context files, which likewise provide further programmatic control of the search engine system.

FIG. 2 illustrates an example a search results page 200 that is provided back to the user's client device, following processing of the context file and the search query. This page 200 includes a set of search results 202 that satisfy the search query, as well as additional information. First, there is displayed a name of the current context 208 that has been provided to the search engine system; the name is simply a description the vertical content site developer's has given to express the type of information need or contextual circumstances that pertains to the current search query. Here, for example the current context 208 is for a "Camera Model", since the search query matched a specific camera model name as determined by processing of the context file. This context operates as the entry point for a user seeking information about a particular camera model.

Second, a number of links 204 are provided as navigational aids to further pages that address different possible information needs of the user. Each of these links 204 is associated with a related context file, which will provide further instructions to the search engine system to tailor further stages in the search process for a specific information need, and thereby construct the desired pages. For example, the first link "If you are trying to decide which camera to buy" addresses a specific type of user information need—information about how to purchase a camera, comparisons between camera, pricing information, and the like—that derives from a specific type of user intent, the intent to purchase a camera. The second link "Where to buy this camera from . . ." addresses a different and more specific information need, the location of vendors for that particular camera. The last link "If you already own one . . ." address yet entirely different type of information need, that is for information that a current own would want, such as technical support and service information, information that is not relevant to the two previous information needs.

Third, the page 200 includes links 206 to other related contexts as well, such as "More Manufacturer Pages", "More Guides", "More Reviews", and so forth. These links each invoke a particular context in which the vertical knowledge provider has characterized particular sites and pages, and then defined a filter for the search engine to select pages with the matching characteristics when processing the reformulated search query.

For example, the vertical knowledge provider has here previously identified a number of different sites or pages on the internet as being variously manufacturer sites, product review, buying guides, and so forth (e.g., according to the type of site). The vertical knowledge provider can label (or tag) a site with any number of category labels. The labels can describe any characteristic that the vertical content provider deems of interest, including topical (e.g., cameras, medicine, sports), type (e.g., manufacturer, academic, blog, government), level of discourse (e.g., lay, expert, professional, preteen), quality of content (poor, good, excellent), numerical rating, and so forth. The ontology (i.e., set of labels) used by the vertical knowledge provider can be either proprietary (e.g., internally developed) or public, or a combination thereof.

For example, the vertical site provider has previously identified a number of sites as containing product reviews, and has stored this information in a context file. The link 206 to "More reviews" automatically would control the system engine system to use this context file to filter the search results during post-processing to those pages that are from sites characterized as product reviews, and satisfying the reformulated query.

Fourth, the page 200 includes various annotations 210 in conjunction with various ones of the search results. These annotations 210 provide the user with the viewpoint or opinion of the vertical knowledge provider about the particular search result, as to any aspect of that search result that the provider considers significant, such as what the identified search result is about, how useful it is, or the like.

The placement, naming, and sequencing of the various links 204,206 are themselves defined in the context files. This gives the vertical knowledge content provider almost complete control over the organization and presentation of the search results, which in and of itself represents that provider's particular perspective and determination of what are the user's likely information needs, and how the search results should be organized to satisfy those needs, and which related contexts should appear in response to each level of search by the user.

FIG. 3 illustrates an example page 300 that is provided to the user as a result of clicking on the first link 204, "If you are trying to decide which camera to buy." The context file associated with this link 204 is processed, and a second search is performed on the search query. This page 300 shows the context name 308 "Choosing a camera", which again reflects the selected information need of the user. The search results 302 in this context are more specifically tailored to assisting the user in evaluating digital cameras and selecting a satisfactory one. Notice, for example, the first search result is to a buying guide for digital cameras, and that there are no search results shows shown here to technical support pages.

Above the search results 302 are links 304 to further related contexts based on information needs, such as "Review, sample photographs", "Other similar cameras to consider", and "Relevant product news". Again, these links have associated context files that will control the search engine system to provide search results that are relevant to the described information needs for these contexts. Next to the search results are additional links 306, which are also to related contexts, and for example to further professional and user reviews of digital cameras, sample photographs, and other information particularly relevant to evaluating a camera for purchase.

The user can thus continue to access additional related context through the various links 304, 306, each time obtaining search results that have been processed according to the context files associated with the selected links. In this way, the user can essentially search the Internet using the powerful capabilities of a general search engine, yet obtaining the benefit of the knowledge, expertise, and perspective of the provider of the vertical content site. Vertical content site providers benefit from this approach as it allows them to further share their knowledge and perspective with users. Vertical content providers are no longer limited to the information that they can either create themselves, provide links to, or comment upon.

With the capabilities of the present invention, vertical content providers can define any variety of context files to meet any type of information need that users may have. The providers of the general search engine system are no longer burdened with the task of themselves organizing and categorizing content (as is conventionally done in various directories and portals), but instead can rely upon the much deeper and vaster pool of vertical content providers—hundreds of millions or more—as compared with the limited pool of editors that may organize content directories or categorize other websites for a general search engine. Indeed, no individual search engine provider could possibly employ the number of individuals with sufficient breadth and depth of experience, knowledge, or perspectives to itself provide the scope and variety of contexts that exists across the entire Internet community. Instead, the present invention provides any vertical content site provider with the capability to programmatically control the general search engine system on behalf of a user conducting a search.

The foregoing example is but one possible use of the present invention, and many more applications and usages will become apparent in the following discussion.

In another manifestation, the context file need not change the order in which the initial results are presented, but only annotate the results with the labels (e.g., tags) that apply to them. Clicking on the label issues a new search, which is restricted to the results having metadata matching the label. In yet another manifestation, these annotations need not be labels but links to relevant pages on other sites.

In yet another manifestation, the query need not originate at the vertical content site, but at the search engine's site, but use the knowledge provided by the vertical content site. In this embodiment, the user indicates to the search engine, either while using the vertical content site or through a sign up process similar to that used to subscribe to RSS feeds that the user would like to apply the vertical content site's contexts while conducting searches of a particular type.

System Overview

General System Architecture for a Programmable Search Engine

FIGS. 4 through 8 illustrate a number of different system architectures in which the present invention can be employed. These architectures generally vary in terms of which entities provide the context files and which entities processes the context files to control the search process and search result presentation. In general, the context files can be provided by any system entity (e.g., any of a client device, a host vertical site, or the search engine system), and can likewise by processed by any system entity, or any combination there.

Figure 4:
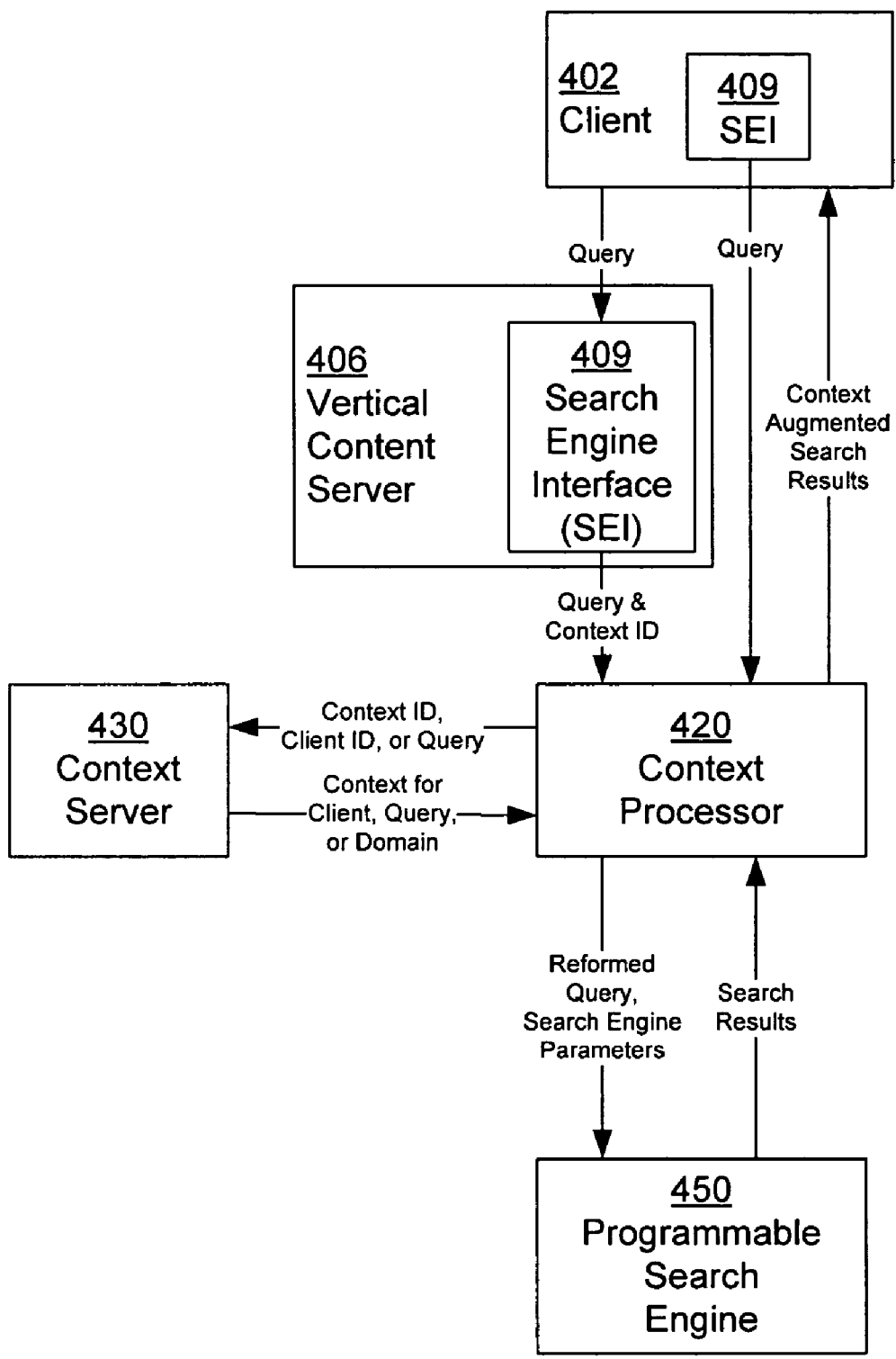
FIG. 4 illustrates a generalized system architecture for the programmable search engine.

Referring first then to FIG. 4, there is shown a generic system architecture. In this system architecture, there is a client device 402, a vertical content server 406, context server 430, a context processor 420, and a programmable search engine (PSE) 450.

The client 402 can be any type of client, including any type of computer (e.g., desktop computer, workstation, notebook, mainframe, terminal, etc.), handheld device (personal digital assistant, cellular phone, etc.), or the like. The client device 402 need only have the capability to communicate over a network (e.g. Internet, telephony, LAN, WAN, or combination thereof) with the PSE 450. Typically, a client device 402 will support a browser application, and the appropriate networking applications and components, all of which are known to those of skill in the art. The client device 402 may include as well a search engine interface that also it to directly query the PSE 450.

The user of the client 402 constructs and transmits a search query to the PSE 450, via the content server 406, which includes a search engine interface (SEI) 409.

This interface can be in part, as illustrated in FIG. 1, via a search query field on a host site that includes the content server 406, along with an underlying link to initiate processing of the input text and forwarding the results thereof to the PSE 450. The content server 406 selects an appropriate context file, as identified by a context ID. The selection of the context file can be based on the query itself, the client device 402, the user identification, default selection parameters, user site behavior (e.g., page accesses, dwell times, clicks) or other information programmatically available to the content server 406. The context ID may be a URL, a unique context name, a numerical ID, or some other form of reference to the context file. The content server 406 transmits the query along with the context ID to the context processor 420. Alternatively, content server 406 can provide the identified context file directly to the context processor. Depending on the embodiment, the content server 406 may also be responsible for serving content pages to the client device 402.

The context processor 420 uses the context ID to obtain the identified context file from the context server 430. The context processor 420 may also pass an identifier of the client device 402 (e.g., IP address, browser type, operating system, device type), the user (e.g., user ID), or host domain from which the search query is received, or the search query itself, to obtain further context files from the context server 430.

As discussed above, a context file (or collection of context files) can include three types of programmatic information that can be used by the context processor 420 and/or PSE 450 to control the search process. These are: 1) pre-query processing operations; 2) search engine control data; 3) post-query processing operations. This programmatic information will be discussed as part of the operational flow.

The context processor 420 processes the context files to perform various pre-processing operations, to programmatically generate a reformulated query. These pre-processing operations may be performed independently or in any combination to obtain a reformulated query. These include the following:

a) Query revision: the modification, addition, or deletion of one or more terms of the original query. Such modifications include correcting spelling errors, including replacing query terms, adding query terms (as conjuncts, or as disjuncts) or deletion of query terms (e.g. stop word removal). The added or replaced terms may broaden or narrow the scope of a query.

b) Creation of additional queries: For example, given an original search query of "digital SLR", an additional query may be "digital camera". These types of query reformulations are expressed in the context file as a series of query rewrite rules. The query rewrite rules generally define an output query (or query term) based on matching one or more terms of the original query (e.g., replace "digicam" with "digital camera"). Other rules may be applied automatically as defaults, without being conditioned on the terms of the query.

The second type of control information processed by the context processor 420 are search engine control data. These include:

a) selection of one or more search engines for processing the reformulated search query. The PSE 450 may include any number of different search engines, each of which is optimized for certain types of searches. For example, different search engines are typically used for text searches, image searches, and audio searches. A search engine typically will generate an information retrieval score for various documents in terms of their relevance to the search query. A context file can specify which search engine(s) is to be used (e.g., by identification of a particular URL for the search engine). The context processor 420 extracts this identified search engine, and constructs the appropriate query string using the reformulated query.

b) selection of one or more document collections for searching. A search engine system will typically have access to multiple different document collections, which can be searched jointly, or individually. The provider of the context file may instruct the PSE 450 to use one or more specific document collections for a particular search. For example, a vertical content site for healthcare professional, may receive a search for "migraine", and instruct the search engine system to search the PubMed database provided by the National Library of Medicine, rather than a more general search of the Internet. This constraint better tailors the results to the medical literature most likely to be relevant to the information need of a healthcare professional, rather than the typical results to such a query on the Internet. The context file can specify which document collections are to be used (e.g., by specification of a database, index, or other context repository). The context processor 420 extracts this information from the context file as well, and passes it the selected search engine as a parameter.

c) specification of search engine parameters for use during query processing. Most search engine algorithms operate under a large number of parameterized controls when generating information retrieval scores, such as threshold values for scoring query term matches, iteration cycles, waiting of links, terms and other query or document attributes. Normally, these parameters are not accessible to entities outside of the search engine system, but rather are fixed by the search engine provider. However, m some embodiments of the present invention, the search engine system may be configured to receive and use any of these types of parameters, thereby giving further incremental programmatic control of the search engine to the vertical knowledge developments. Again, the context processor 420 extracts these parameters from the context file and passes them to the PSE 450 as parameters.

The context processed query, which includes the reformulated query and the search engine control data (if any) that are specified in the context file, is thus provided to the PSE 450. If multiple queries are constructed during pre-processing, the context processor sends each of the multiple queries and their associated search engine control data (which may be individually varied for each additional query).

The PSE 450 processes the reformulated query using the search engine control data (if any) to obtain a set of context processed search results, and provides these search results back to the context processor 420. If multiple queries are processed, then the PSE 450 can merge the results from these searches.

The context processor 420 then provides various post-processing operations, which again may be performed independently or conjointly. The results of this post-processing made part of the context processed search results. The post-processing operations include:

a) filtering the context processed search results using filters specified in the identified context. The context file may specify one or more filters that the context processor 420 can apply to further limit the documents that are included in the search results. These filters are expressed in terms of rules that match metadata with particular metadata associated each search result. The metadata can include both native metadata to the document, such the document type, date, author, site, size, or labeled metadata associated with the document, that is the labeled characteristics provided by the vertical content provider (or others).

For example, the filters may be defined to exclude documents of certain types (either physical types, e.g., image files, or logical types, e.g., "reviews"), from particular sites or internet domains (e.g., documents from the .biz or .gov domain), websites, or of a certain vintage (e.g., documents published before Mar. 3, 2005). Referring back then to the example of FIG. 3, the link 306 for "More Professional reviews" would invoke a filters defined to select only documents labeled as "professional", "product reviews". Again, these labels can be provided by the vertical knowledge content provider from which the original query was sourced, or from some other source. These options will be more fully discussed below.

b) ranking of the context processed search results using ranking parameters specified in the context file. The PSE 450 includes a ranking function that ranks the search results based on the respective information retrieval scores. The context file can include ranking parameters, such as weighting factors to increase or decreases the IR scores for particular types of documents, for documents from selected sources. The ranking function may also operate on identifiable native or labeled metadata. For example, the rankings can be adjusted based on length of document, publication date, or document format just to name a few. Alternatively, the ranking may be adjusted based on labeled metadata, such ranking by expressed "rank" value, or by as increasing the native ranking of documents labeled as "expert" by a weight factor, or increasing the ranking of documents having a some specified quality measure of "10". The context processor 420 can use these ranking parameters to rank the documents in the search results.

c) clustering of the search results using clustering parameters. The context processor 420 may also cluster (group) the search results according to parameters provided in the context file. The parameters can specific clustering based on native or labeled metadata. Thus, all documents labeled as "professional reviews" can be clustered together; or all documents where are image files can be clustered, or documents from a given domain (e.g., all documents from xxxx.com).

d) providing navigational links in the context processed search results to additional contexts. As illustrated in FIGS. 2 and 3, the context processor may also provide links that can be accessed to invoke additional searches for further refinements of the information needs of the user. Each such related context link invokes another cycle of pre-processing and/or post-processing by the context processor 420 and if so instructed, another cycle of query processing by the PSE 450.

e) annotating the context processed search results using annotations specified in the identified context. As illustrated in FIGS. 2 and 3, the context file may also provide specific annotations 210 that can be included with any of the search results.

The context processor 420 then provides the context processed search results to the client device 402. As noted, the user can access any of the related context links, or perform entirely new queries, again making use of any context files that are selected based on such queries.

The client device 402 may also query the PSE 450 directly, either through its search engine interface 403, or simply by going to the website of the PSE 450 entering the query directly there. In this scenario, context processing is still handled by the context processor 420 in manner described above.

Programmable Search Engine System Based Context Processing

Figure 5:
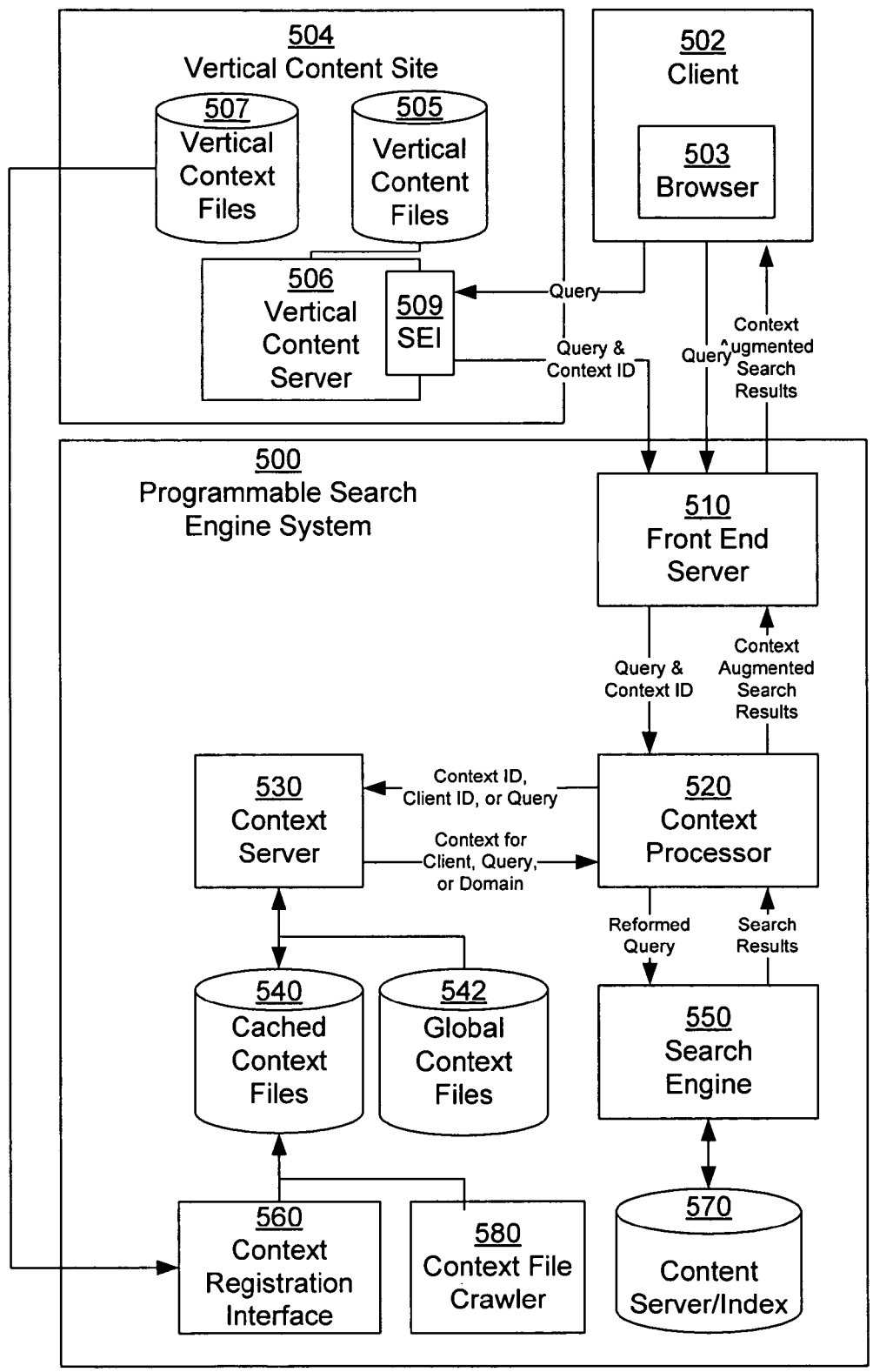
FIG. 5 illustrates a first system architecture for a programmable search engine.

Referring now to FIG. 5, there is a shown a system architecture in which the context processing operations are provided by the PSE system itself. In this embodiment again there is a client device 502 including a browser 503, along with a host vertical content site 504, and a PSE system 500. The vertical content site 504 includes a vertical content server 506 (e.g., a web and/or application server) and vertical content files 505 (e.g., a database or directory of web pages). Also present are vertical context files 507. The vertical content site 504 also includes a search interface 509 to the PSE system 500, such as a search field and search button as illustrated in FIG. 1. The user accesses the vertical content site 504 using the browser 503, and from that site can enter a search query to be processed by the PSE system 500. The vertical content server 506 processes the search query to determine a context ID for an appropriate context file, and transmits the search query and context ID to the PSE system 500. For example, the context ID can be transmits as a parameter in a URL to the PSE system 500. The vertical content site 504 also includes a number of conventional components (e.g. firewalls, router, load balancers, etc.) not shown here in order to not obscure the relevant details of the embodiment.

The PSE system 500 includes a number of components. A front end server 552 provides the basic interface for receiving search queries. The front end server 552 extracts the context ID and query, and passes that to a context processor 520. The front end server 552 may also provide an identifier of the client device or the user to the context processor 520. The context processor 520 provides the context ID and query, to the context server 530. The context server 530 uses the context ID to retrieve a context file from a repository of cached context files 540. The context files are received from any vertical content site 504, including the illustrated site 504, via a registration interface 560. This allows any provider of a vertical content site 504 to define the context files that are to be used for handling queries from their site and upload such context files for storage by the PSE system 500. Alternatively, the context files are extracted from the vertical content sites 504 by a context file web crawler 580. The registration and crawling methods may be used together. One implementation would be for the vertical content site 504 to first register its context files 507, which includes putting the site address on a crawl list. Subsequently, the crawler 580 crawls the site 504 to obtain any updates to the context files 507. Caching of the context files ensures very high speed processing of the context files at query time, since context processor 520 does not need to retrieve the context files from the remotely vertical content site 504, and thereby does not incur network latency (or problems with the vertical content site being unavailable).

The context server 530 may also obtain context files from a repository of global context files 542. These context files can be derived from data mining on the cached context files 540, provided by the provider of the PSE system 500, or any combination thereof.

The context server 530 provides the retrieved context file(s) to the context processor 520. The context processor 520 performs the appropriate pre-processing operations (if any) as defined in the context file to generate the reformulated query, and establish the search engine control data as set forth above, as part of the context processed query. The search engine 550 receives the context processed query, including reformulated query and search engine control data, and executes a search on same to provide a set of context processed search query results. These results are passed back to the context processor 520, which performs the post-processing operations on the search results as defined in the context file, to further modify the context processed search results. These processed results are then transmitted back to the client device 502.

This architecture provides various benefits. First, as pointed it provides for high speed access to the context files and eliminates reliance on the availability of the remote vertical content sites to serve their context files on demand.

Second, collection and aggregation of the context files 520 allows for various systemic to be achieved from analysis of the context files. It must be appreciated that over time, the number of vertical content providers employing context files will easily reach millions if not hundreds of millions, given the breadth and depth of the Internet. There are currently over 200,000,000 Internet sites, and that number is increasing at a rate of more than 10% per year. Even if only 1% of vertical content providers used context files, that would exceed 2,000,000 such collections of context files, providing a very rich repository of information.

Specifically, the following types of information may be aggregated from the collected context files. The rules used to define the query pre-processing operations can be accumulated and used to identify the most frequently used rules for various query terms. To a large extent this type of information is more reliable, having been essentiality voted on by a large population of interested providers, as opposed to rules designed by a very small team of editors.

Similarly, analysis of the search engine control yields identification of most frequently used search engines, indices, and parameters for particular queries or types of queries. Analysis of the query post-processing operations also identifies the most frequently used annotations, related contexts, ranking and filtering operations.

As mentioned above the context files includes label metadata used by the vertical knowledge content providers to describe the characteristics of any site or page on the Internet. In one embodiment, these labels are selected from a publicly provided ontology, so that vertical knowledge content providers use the same set of labels to characterize the content of the Internet. The ontology of labels can describe categories and instances of any type. The ontology includes, for example, topics, information types, information sources, user types, and rating scales, just to name a few possible aspects of the ontology. Accordingly, from the cached context files 540 a categorization of Internet content can be derived and validated. By way of simple example, all Internet sites labeled as type "buying guide" and category "digital camera" can be extracted from the cached context files 540. A directory of these digital camera buying guides can then be constructed, for example by selecting those sites having that have a minimum number of appearances in the context files. This approach again leverages the collective judgment of the vertical content providers—that is, the wisdom of crowds—as to the nature, type, and quality of content on the Internet.

From the foregoing, the PSE system 500 can extract and establish a collection of globally optimized context files, where the query preprocessing rules, search engine control data, and query post-processing rules are derived from statistically analysis of cached context files for the frequency, distribution, variability and other measures of the usage of context information.

One scenario for this architecture is to support direct search queries with post-query context processing. In this embodiment, a user query is received directly from the client device 502, without first being passed through a vertical content provider site 504. The user's search query can be received directly at the website of the PSE system 500 (e.g., via search query page), or a search interface in browser toolbar, application, or system extension (e.g., a search interface on the user's desktop). In any event, the user's search query is handled without context based preprocessing, (that is query modification based on a vertical content provider's context files), though internal adjustment of the search query may be performed as part of native search operations. However, the search results are then post-processed with one or more context files, to provide the various types of navigational links, related context links, and/or annotations on search results as described and illustrated in FIGS. 2 and 3.

Another beneficial aspect of this architecture is that analysis of the context files also allows for integration of advertisement purchases based on contexts. That is, advertisers can bid for placement of their advertisements in specific contexts, rather than by specific query terms. For example, an advertiser may bid for placement of an advertisement for its digital camera when the context file for a query indicates that the user is shopping for a particular camera model, but not when the user is seeking technical support. This allows advertisers to more precisely focus their advertising efforts based on the user's information needs—which have been expressly described by the context files, rather than merely inferred from the query terms.

Vertical Content Provider Based Context Processing

Figure 6:
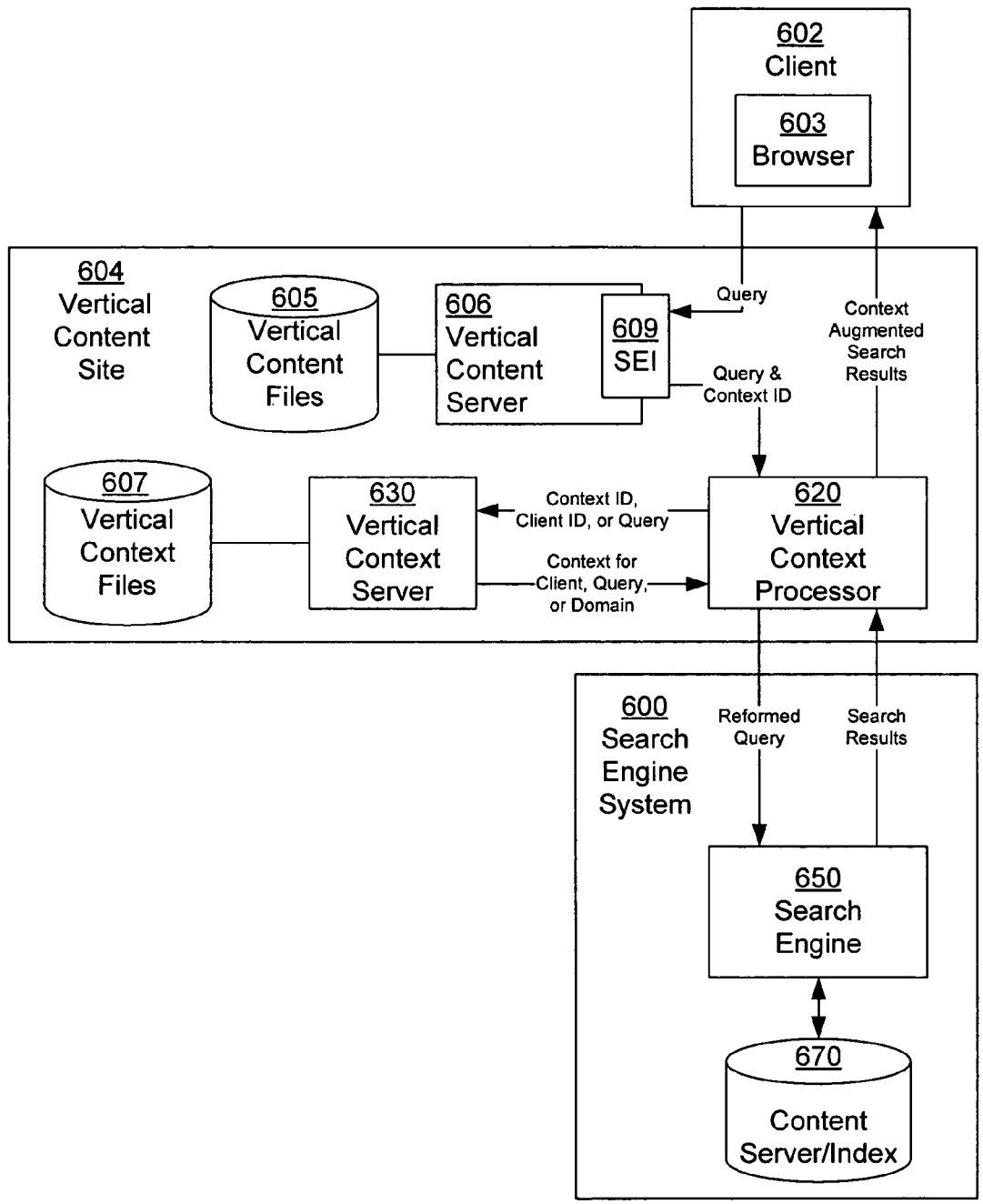
FIG. 6 illustrates a second system architecture for a programmable search engine.

Referring now to FIG. 6, there is shown an embodiment of a system architecture in which the context processing is provided by the vertical content site itself. In this embodiment again there is a client device 602 including a browser 603, along with a host vertical content site 604, and a general search engine system 600. The vertical host vertical content site 604 includes a vertical content server 606 and vertical content files 605 (e.g., a database or directory of web pages). The vertical content site 606 also includes a search interface 609 to the search engine system 600, such as a search field and search button as illustrated in FIG. 1. The user accesses the vertical content site 604 and from that site can enter a search query to be processed by the search engine system 600.

In this embodiment, the vertical content site 604 also includes various components for context processing, including a vertical context processor 620 and local vertical context files 607. As before, vertical content server 606 receives a search query from the client device 602, e.g., via the browser 603, and processes the search query to determine a context ID for an appropriate context file. This information is now provided to the vertical context processor 620. The context processor 620 passes the context ID (and optionally the client device ID, user ID, and query) to the context server 630. The context server 630 uses the context ID to retrieve a context file from the vertical context files 607.

The context server 630 provides the retrieved context file(s) to the context processor 620. The context processor 620 performs the appropriate pre-processing operations as defined in the context file to generate the context process search query (including the search engine control data as set forth above). The vertical context processor 620 then invokes the search engine 650 to process the context processed query.

The search engine 650 receives the reformulated query and search engine control data, and executes the search accordingly, generating the context processed search results. These results are passed back to the context processor 620, which performs the post-processing operations on the search results as defined in the context file, to further modify the context processed search results. These processed results are then transmitted back to the client device 602.

The context processor 620 may also provide some or all of the search engine control data to the search engine, depending whether the search engine 650 exposes an application programming interface. In some embodiment, where the search engine 650 is closed, then the context processor 620 simply passes the queries to the search engine 650 and operates on the results. In this embodiment, the context processor 620 itself would use at least some of the search engine control data, for example, selection of which search engine to use. This gives the vertical content site provider control as to which search engines 650 to use with which types of user queries.

Client Based Context Processing

Figure 7:
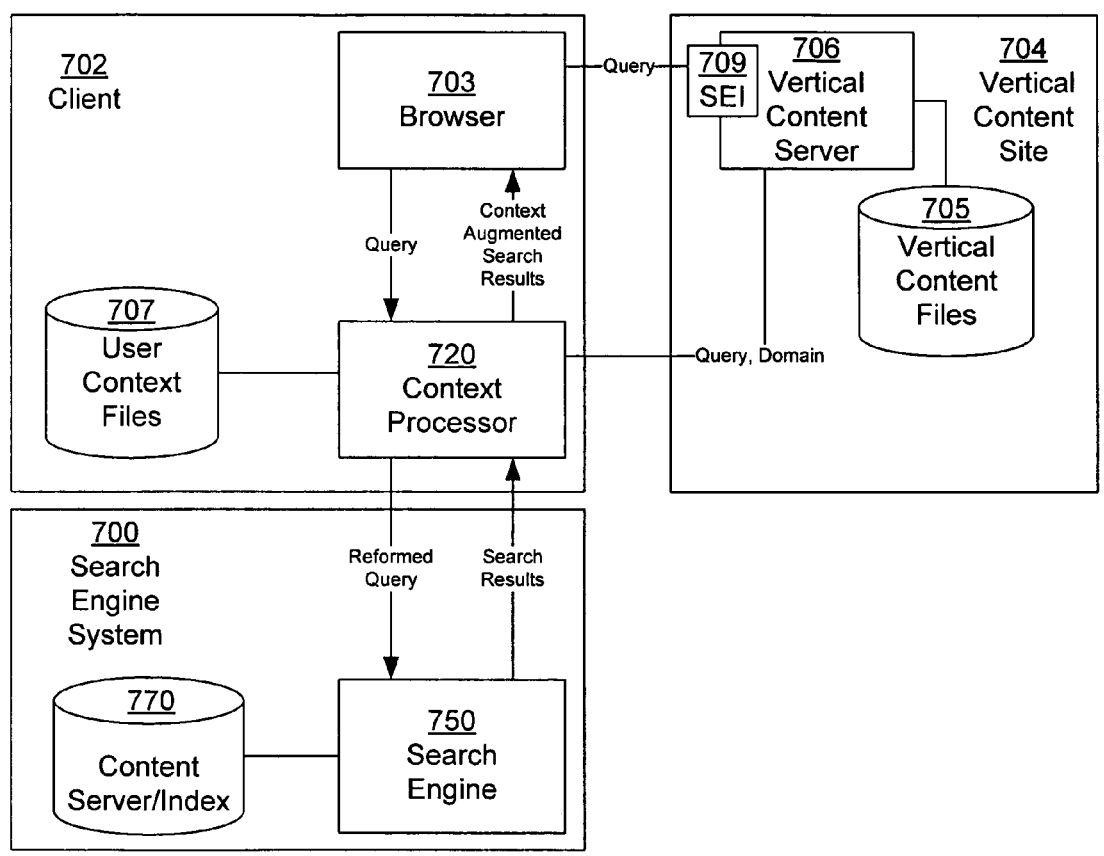
FIG. 7 illustrates a third system architecture for a programmable search engine.

Referring now to FIG. 7, there is shown an embodiment of a system architecture in which the context processing is provided by the client device site. In this embodiment again there is a client device 702 including a browser 703, along with a host vertical content site 704, and a general search engine system 700.

As before, the vertical host vertical content site 704 includes a vertical content server 706 and vertical content files 705 (e.g., a database or directory of web pages). The vertical content site 706 also includes a search engine interface 709 to the search engine system 700, such as a search field and search button as illustrated in FIG. 1. The user accesses the vertical content site 704 using the browser 703 and from that site can enter a search query to be processed by the search engine system 700.

In this embodiment, the client device 702 includes the various components for context processing. First, the client device 702 includes a browser 703, for accessing the vertical content site 704 as well as any other available site on the network. The client 702 includes a vertical context processor 720, which can operate a plug-in to the browser 703, or Java applet. Here, the once the user makes the query via the vertical content server 706, that query is also provided to the vertical context processor 720. The context processor 720 again processes the search query to determine a context ID for an appropriate context file. Since the operation is local to the browser, the context processor 720 can use the context ID to retrieve a context file from the user context files 707.

The context processor 720 then performs the appropriate pre-processing operations as defined in the context file to generate the context processed query. The vertical context processor 720 then invokes the search engine 750 to process the context processes query. The search engine 750 receives the context processed query, and retrieves search results, forming the context processed results. These results are passed back to the context processor 720, which performs the post-processing operations on the search results as defined in the context file, to further modify the context processed search results. These processed results are then passed back to the browser 703.

An advantage of this architecture is that it allows the user to establish and user their own context files. Just as individual vertical content providers have their individual expertise and viewpoint, so to do individual users. Thus, a user may define context files to categorize and label particular websites, for example, identifying the site that she considers most authoritative or useful for particular topics. The user can also define query pre-processing operations, or more likely import such operations from others (e.g., experts in various topical domains) who publish context files for this purpose. Similarly, the user can define post-processing operations that allow for customization in the presentation of results, including arrangement of results into clusters or grouping that the user feels most comfortable with. For example, a user can define a personal context file in which search results are always clustered into academic (.edu), government (.gov), retail shopping (sites having metadata or text indicative of online purchasing), and image files.

Unified Architecture for Mutual Context Processing

Figure 8:
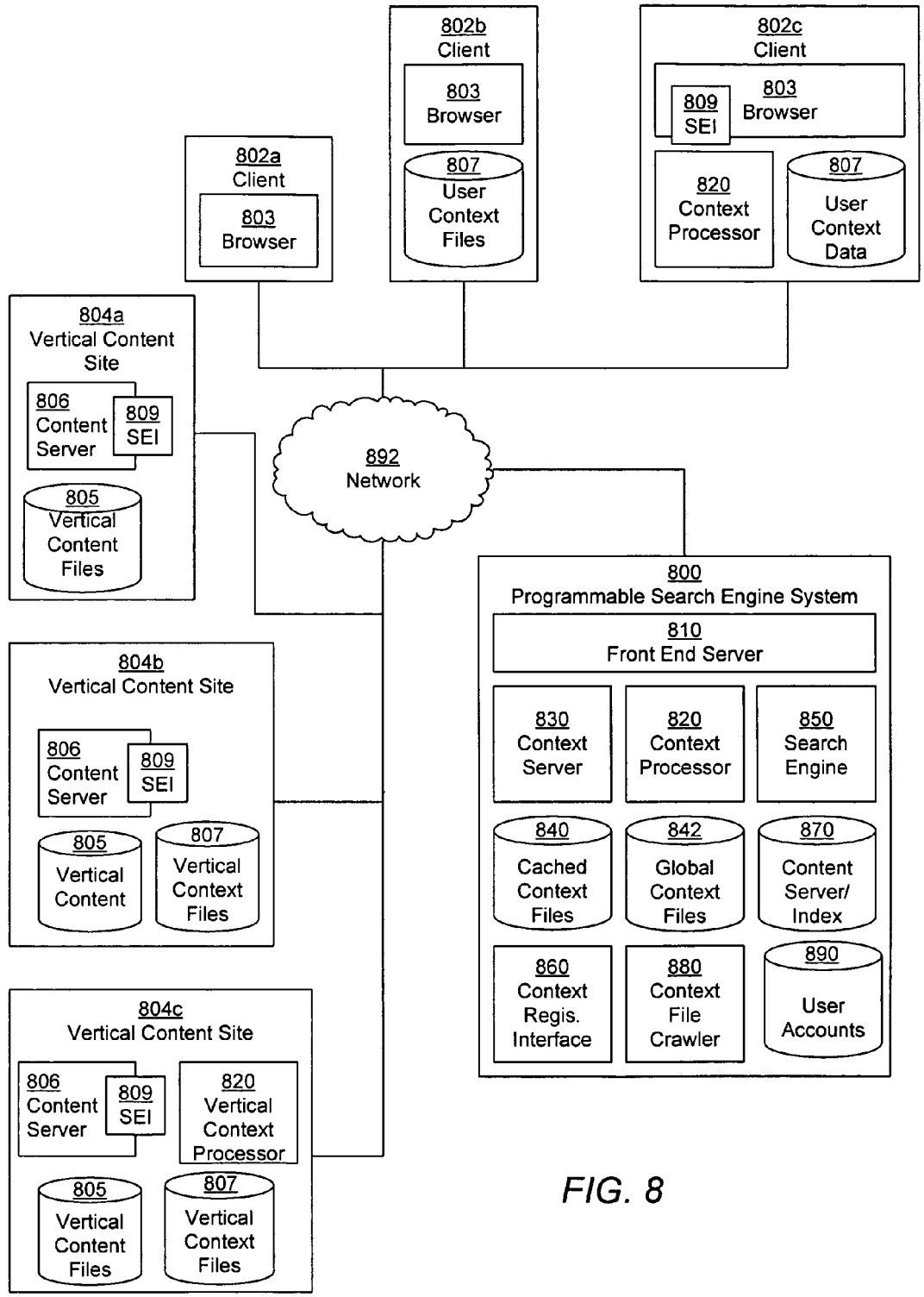
FIG. 8 illustrates a combined system architecture for a programmable search engine.

The various architectures illustrated in FIGS. 4-7 can all operate concurrently with different types of the individual systems operating together. FIG. 8 illustrates this system architecture for mutual and concurrent context processing. All of the system elements communicate via a network 892, such as the Internet.

First, the PSE system 800 includes a complete set of components as described with respect to FIG. 4. The operative features of these components have been previously described and so are not repeated here.

Next, three types of client devices 802 are in operation. Client device 802*a* simply has a browser 803 by which it accesses various sites on the Internet. Client device 802*b* includes a browser 803, as well as user context files 807, which can be passed to any available context processor 820 for processing in conjunction with a search query provided by the user.

Client device 802*c* includes a browser 803 and user context files 807, as a well its own context processor 820. This enables the client 802*c* to perform local context processing on the user's search query prior to sending the query to the search engine, as well as performing post-processing operations after receiving the search results. This client's browser 803 also includes a search engine interface 809, enabling direct querying of the PSE system 800. It is contemplated (but not illustrated) that the other clients 802*a* and 802*b* may also include search engine interfaces 809, for example, in the toolbar of their respective browsers 803.

The three types of different vertical content sites 804 are also shown. Vertical content site 804*a* includes a content server 806, along with a search engine interface 809 to the PSE system 800, as previously described. The server forwards a user's query (from any type of the client devices 802) to the PSE system 800, providing as well the context ID associated with the user's current context (along with any context related information received from the client device). The site does not need to store its own context files, as these can be stored at the PSE system 800 in the cached context file database 840.

For this type of vertical content site 804*a*, the PSE system 800 provides all of the context processing operations. Here, the site 804*a* does not provide any specific context ID information. As a result, the PSE system 800 can provide its own context identification mechanisms, for example based on the site 804*a*, the client 802, the query terms, or the like. Using the context information, the context server 830 retrieves the appropriate global context files 842, and the context processor 820 uses these files for the context processing operations, including pre-processing of the search query, control of the search engine operation and parameters, and post-query processing. The programmable search engine site 800 passes the context processed search results back to the requesting client, either directly, or within the scope of the vertical content site 804*b*, e.g., using framing techniques.

As with vertical content site 804*a*, vertical content site 804*c* includes its own content server 806 search engine interface 809, vertical content files 805, as well as local vertical context files 807. This site 804*b* receives a search query from a client device 802; and forwards the query along with the context ID for the query context to the PSE system 800. The site's vertical context files 807 are cached in the PSE system's cached context files 840. The PSE system 800 receives the context ID, and uses its context server 830 to retrieve the associated context files for site 804*b* from the cached context files 840. The context server 830 may also retrieve any applicable global context file 842. The PSE context processor 830 then processes the retrieved context files, generates the context processed search query and processes the queries via the search engine 850. The context processed search results are the further post-processed by the PSE context processor 820, again in accordance with either the site's context files or the global context files 842 (including where appropriate a combination thereof).

The last type of vertical content site 802*c* includes its own content server 806 search engine interface 809, vertical content files 805, local vertical context files 807, as well as a local, vertical context processor 820. The local context processor 820 receives the user's search query, along with the context ID for the user's context, and using the referenced context files performs the appropriate pre-processing operations on the query prior to transmitting it to the PSE system 800, along with the search engine control data specified by the context files.

Here, the PSE system 100 can provide various levels of services to the vertical content site 804*c*. Minimally, the programmable search engine system 800 can process the received context processed queries, and execute these queries accordingly via the search engine 850, providing the context processed search results back to the local context processor 820 for further modification. The local context processor 820 for the vertical content site 804*c* provides further post-processing operations specified by the identified context, and then forward the final set of context processed search results to the client device 802.

Alternatively, the PSE system 800 can perform some specific context processing operations as instructed by the local context server 820, whether pre-processing, or post processing, or control of the search engine operations. For example, the local context processor 820 may perform the pre-processing operations to reform the queries, but then use the search engine control data to specify which document collections and search algorithms the search engine 850 should use. In addition, the PSE system 800 may also add its own layer of context processing based on its global context files 842, including generation of additional reformulated queries, control of the search engine 850, and post-processing of search results prior to returning them to the vertical content site's local context processor 820. The vertical content site 804*c* can forward the context processed search results to the client device 802 directly, or can invoke another layer of post-processing operations by the local context processor 820, perhaps to further fine tune the organization, commenting, or navigation features thereof.

The PSE system 800 can provide context processing directly to user queries input at the PSE site from any of the client devices 802. The user's search query can be received directly at the website of the PSE system 800 (e.g., via search query page), or a search interface in browser toolbar, application, or system extension (e.g., a search interface on the user's desktop). Since the user's query is not coming from a vertical content provider, the PSE system 800's context processing can use the global context files 842, including those for annotating search results with links to potentially useful context for the user.

The degree of context processing for direct queries can be varied, to include either pre-processing or post-processing individually, or together. One embodiment of direct query handling is providing a context-based post-processing on the search results, without context based preprocessing (e.g., query modification). Here, the user's search is received and executed without pre-processing based on the context files of a specific vertical content provider (though some internal adjustment of the query and selection of search indices may be employed to provide the most relevant search results). As described with respect to FIG. 5, the search results are then post-processed with one or more context files, to provide the various types of navigational links, related context links, and/or annotations on search results as described and illustrated in FIGS. 2 and 3.

The post-processing operations in this scenario can use either global context files 842, or can be based on the context files of any number or selection of the vertical content providers. In one embodiment, a user can identify which the vertical content provider whose context files are to be used for context processing. Identification can be done via a subscription model, in which the user subscribes to have such context processing done for her or her queries, for example via a subscription interface (e.g., page) at the website of the vertical content provider, which then forwards an identifier of the user or the user's client device to the PSE 800. A user may subscriber to a particular vertical content provider in order to have that provider's expertise, perspective or viewpoint applied to the user's search queries and results, without the user having to always enter a query from that vertical content provider's site.

For this embodiment, the PSE system 800 includes a user account database 890, which stores for each user various types of personal preferences for searches, including the subscriptions to particular vertical content providers. The PSE 800 also provides a registration interface (allowing the user to register with the PSE system 800 for storing search preferences, subscription information, and other user settings), and a login interface for the user to login and have the user's settings applied to the user's queries. Direct queries received from the user and/or the user's client device 802 are identified by the PSE 800 and then the appropriate context files to which the user subscribed are used for context processing. In another embodiment, similar to the foregoing, subscription-based context processing is provided for direct user queries for both pre-processing and post-processing operations.

The selection of which vertical content providers' context files are to be used (whether for pre-processing, post-processing or both) can be based on other factors beyond a user's subscriptions, as some users may not have subscribed to any particular vertical content provider. In one embodiment, the selection is based on a popularity measure for each vertical content provider whose context files are included in the cached repository. The popularity measure can be based on web access statistics, like number of unique visitors to a vertical content provider's site each month (or other time period), number of hits to such site, number of current subscribers to the vertical content provider. These and other statistical measures can be combined into a popularity measure. Alternatively, or additional, the selection can be based on a reputation measure (or rank), where the reputation of each vertical content provider is judged and rated by users.

In summary, the foregoing provides a general overview of the operations and various system architectures useful with the present invention. As can be seen, the present invention can be practiced in a number of different and complementary embodiments. The capability of the present invention enable any system entity to provide context files, context processing (or both) results in both tremendous flexibility and power. The flexibility (e.g., any system entity can provide various levels of operative support, and cooperate with any other system entity) allows for rapid, widespread and easy implementation of the present invention. The context files and context processing capability can be readily implemented in any vertical content site and in any client. The power of the system derives in part from such widespread distribution and implementation: the more context files and context processing is adopted, the more contextual information can be accumulated and leveraged, for example in the global context files. This enables the PSE system to continually refine and adapt its capabilities to the information needs of the wide variety of users. Further, the widespread use of context files by vertical content developers continually expands the range of information needs and perspectives that can be satisfied, as well as the depth and quality of that information that is used to satisfy such needs.

Contexts

Overview of Context File Implementation

Figure 9:
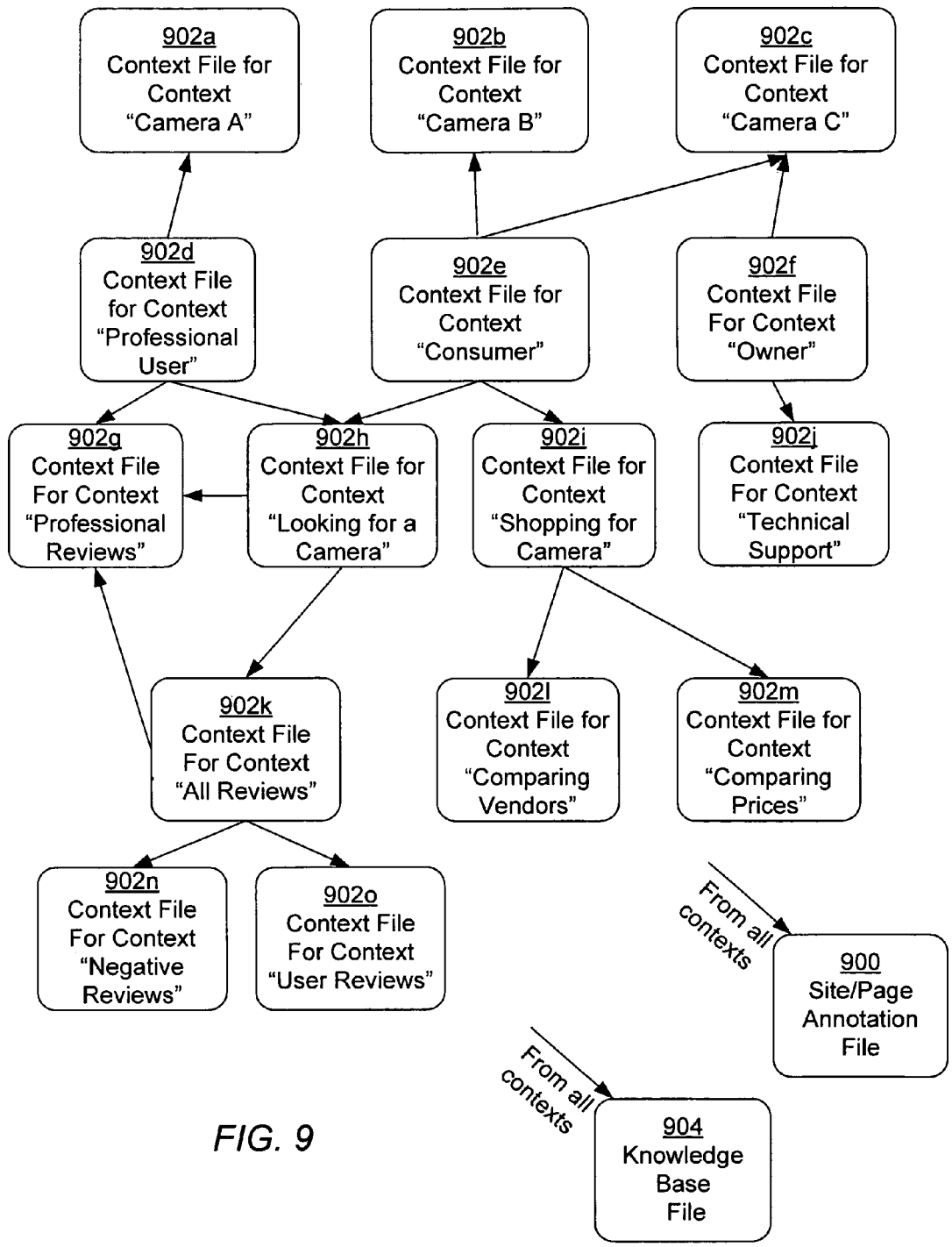
FIG. 9 illustrates a simple example of a set of context files.

Referring now to FIG. 9 there is shown a simple example of a set of context files as might be developed by a vertical content provider for a digital camera related website. This simplified example is used only to illustrate some of the basic aspects of context files, and not as definitive statement of their characteristics.

In this example, the vertical content provider has provided a variety of context files that suit different types of information needs, and different types of available resources. Context files 902 are illustrative of contexts defined for various types of users of digital cameras, such as a professional user searching for a digital camera, a consumer searching for a digital camera, and an owner who already has such a camera. Each of these types of users has different information needs and typically different approaches to evaluating the information she obtains. For example, a professional user is typically most concerned with technical performance issues such as picture quality, durability, and compatibility with an existing set of professional equipment, whereas a consumer user is typically concerned with ease of use, convenience and price. Both of these types of users are seeking information during their purchase process that is quite different from an existing owner. An owner is not typically interested in obtaining further opinions or evaluations of a product, but rather information pertaining to its use, technical support, service, or warranty issues.

Each of these three user type context files 902 contain instructions that enable a context processor to respond to a specific query according to the expected information needs of the user. Thus, the context file 902d for the professional user may include query revision rules to modify a received query such as "Nikon camera" to "Nikon DX2", which is a current model of a professional digital SLR, and one deemed by the content provider to be of most interest to the professional user. By contrast, the context file 902e for the consumer user may include query revision rules to modify this same query to "Nikon Coolpix 7600", again a current model of the Nikon cameras, and determined by the content provider to be the best Nikon camera for a typical consumer user. Continuing this example then, the vertical content site would pass the consumer context file 902e to a context processor along with the user query of "Nikon camera", and the context processor would use the query modification rules to generate the appropriate revised query for execution.

The arrangement and interrelationship of the context files is highly flexible and is decided by the particular vertical content provider. Each of the context files 902 can point to any number of other context files 902 in an arbitrary graph manner, as best determined by the content provider. For example, the consumer user context file 902e references two other context files, the "Looking for a Camera" context files 902h, and the "Shopping for a Camera" context file 902i. These context files more precisely focus on serving the user's intention, the former focusing on the information needs when a user is still looking for a camera and in need of information to evaluate potential products. The latter context is appropriate when a particular camera has been selected and the user is now shopping for the camera based on price, availability, and other factors. Again, each of these context files 902 references different and more selective contexts. Thus, the "Looking for a Camera" context file 902h references a group of context files 902k pertaining to various types of reviews of digital cameras. The "Shopping for a Camera" context file 902i references context files 902m, 902l for comparing prices, and for comparing vendors. The context files 902 can also be arranged hierarchically through a series of directories.

As previously discussed, a context file may include query revision rules, and search engine control information that enables the context processor to programmatically tailor the user's query to the information needed, as indicated by the context. For example, once the user enters the "Looking for a Camera" context, that context file 902h may contain search control data that selects specific websites that contain consumer oriented camera reviews, as deemed appropriate by the vertical content provider. This control data would thus be used by the search engine system to select one or more document collections for targeting the query (or revised queries) thereto.

Similarly, the "Shopping for a Camera" context file 902i would include search control data that selects various price comparison engines to obtain current market prices on a given camera. These examples illustrate how selection of a context can programmatically vary the search query and search control data and parameters in order to better suit the user's information needs.

It is important to further point out here that the specific editorial decisions reflected in each context file 902—how to revise a query based on whether the user is a professional or a consumer, or which sites to search depending on whether the context is shopping or looking—are made by each vertical content provider individually. This gives each vertical content provider—such as those with expertise in a particular field, such as digital cameras—the ability to define the contexts as they see fit, thereby using their own judgment, expertise, knowledge, and opinions to make the various determinations. Each vertical content provider can define very detailed and precisely crafted contexts, each of which can specifically control the operations of the programmable search engine in responding to a search query. Users ultimately benefit from this individuated capability because the vertical content providers to create a dynamic information "market": a market not merely for content itself, but for perspective, experience, and knowledge. That is, vertical content providers now offer users the ability to "search the world" through their own point of view, as suggested in FIG. 1 by the text "Search the web with digitalslr.org."

Site/Page Annotation File

One mechanism for encapsulating the expertise and judgment of each vertical content provider is, at least in part, the site/page annotation file 900. This context file 900 includes information variously categorizing or describing characteristics of sites or pages on the Internet. Each entry in the site/page annotation file 900 provides an identifier of a site or page, e.g., a URL, along with a number of tags or token identifying attributes, characteristics, weightings, or other qualitative or quantitative values. The tags can be explicitly typed (e.g., as <tag, value> pairs), or implicitly typed based on order and data format. A URL can specify a site or page completely, or in part as a URL prefix, for some portion of a web site. Such an annotation file 900 can be provided using existing standard formats such as RSS (RDF Site Summary or Really Simple Syndication).

The following are some examples of the contents of a site/page annotation file:

url, http://www.dealtime.com/xPR-Nikon_D100~RD-81887137412,
descriptor, Review/NegativeReview,
rank, 6,
comment, "Professional Photographer lists various shortcoming and compatibility problems"
url, http://www.dealtime.com/xPR-Nikon_D100~RD-81887137412,
descriptor, Review/ProfessionalPhotographerReview,
rank, 0,
comment, "Professional Photographer is less thrilled than many others about the D100"
url, http://www.dpreview.com/reviews/read_opinion_text.asp?prodkey=nikon_d100&opinion=15851,
descriptor, Action,
rank, 0,
comment, "Short review on using the D100 for sports photography"
url, http://nikonimaging.com/global/news/,
descriptor, News,
rank, 3,
comment, "Nikon's web site. Lots of info, but hard to navigate"
url, http://www.kenrockwell.com/tech/2dig.htm,
descriptor, Guide,
rank, 0,
comment, "Explains Digital SLRs vs Point and Shoots"
url, http://www.luminous-landscape.com/tutorials/nikon-sn.shtml,
descriptor, Review/ProfessionalPhotographerReview,
rank, 8,
comment, "Extremely detailed, very technical, comparative review"
url, http://www.photographyreview.com/,
descriptor, Review,
rank, 6,
comment, "Good all around site for photography buffs"
url, gallery.photographyreview.com/showphoto,
descriptor, Photos,
rank, 8,
comment, "Good showcase of great photography with a wide range of cameras"

-continued

```
url, http://www.olympusamerica.com/,
descriptor, Manufacturer,
rank, 10,
comment, "Olympus's web site. Well organized and
   informative"
```

In this embodiment of a site/page annotation file 900, each entry is a set of <name, value> pairs, as follows:

URL: provides the network address for where the site or page is located. Note that both specific pages within sites can be identified, as well as home pages for large sites.

Descriptor: a semantic label describing the site or page. The content provider is free to use any labels he or she chooses, since the query processing and post processing operations are written in terms of rules that can operate on these same descriptors. In the above example, the vertical content provider has labeled various sites/pages to their content type (e.g.,"Negative review" or "News" or "Photos"), as well as to the type of entity which provides the information (e.g., "Manufacturer"). Again, these descriptors are merely illustrative, and the selection of which particular descriptors are used to describe a site will be dependent in at least in part on the particular category or topic for the subject matter of the domain.

Referring back then first entry here is for a specifically identified page on a remote site (dealtime.com) that contains a "negative review" of the Nikon D100 camera The preprocessing and post processing operations can use the tags as conditions for evaluation. For example, a post processing rule in the "Negative Reviews" context file 902*n* would select for inclusion in the search results that had a tag "Negative Review/NegativeReview". The various tags shown above—Manufacturer, Guide, Photos, etc.—are merely illustrative of the scope and variety that can be used. The ability to tag any site or page with a semantic label allows for very powerful pre-processing and post processing operations by the context processor.

In one embodiment, there is provided a common ontology of tags which can be used, either exclusively or in conjunction with a set of private tags defined by vertical content provider. The ontology includes a hierarchy of categories of information and content on Internet. One useful ontology is provided by the Open Directory Project, found at dmoz.org. All or a portion of such an ontology can be used for the tags. The ontology can be public, as in the OPD, or proprietary, or a combination of both.

Rank: Each entry can have a rank (or "score", "weight", etc.) a figure of merit as to the importance, quality, accuracy, usefulness, and the like of the particular page or site. This value is provided by the vertical content provider, again based on his or her own judgment and perspective. The rank value further allows the context processor to selectively include (or exclude) search results that have certain rank values, or to rank individual search results by this value as well.

Comment: Each entry can have a comment, explanation or description that the vertical content provider can use to further describe the page to the user. The comment allows the vertical content provider to further articulate the relationship between the page and the user's information need.

Note further, that a given site or page can have multiple entries in the site/page annotation file 900, each with its own descriptors, and other tags. For example, the first two entries above are for the same page, but with different descriptors, ranks, comments and so forth. When more than one entry matches a given URL, depending on the use, either both or the most specific entry is applied.

The URL, Descriptor, Rank, and Comment fields are illustrative of the types of information that can be included in the site/page annotation file 900. The vertical content provider can define any number of other or additional attributes, and then define complementary pre-processing and post-processing rules that operate on such attributes. For example, other attributes that can be included in the site/page annotation file include:

Content Type: a designation of the type of site or page, such as guide, scientific article, government report, white paper, thesis, blog, and so forth.

Source Type: a designation of the source of the document, which maybe the same or different than the Tag. For example: government, commercial, non-profit, educational, personal, and so forth. An "Organization" attribute may serve a similar purpose.

Location: a designation of the country, state, country or other geographic region relevant to the page, using names, standard abbreviations, postal codes, geo—codes, or the like.

User Type: a designation of the intended type of user or audience for the site or page. For example, lay person, expert, homemaker, student, singles, married, elderly, and so forth.

The foregoing descriptors are themselves instances or specializations of a generic attribute type 'tag'. Accordingly, vertical content providers can choose to simply use the "tag" designation in association with a property value (e.g., tag, "Manufacturer"), or may use some specialization of tag, such as those listed above, or a combination of both approaches. This feature further enhances the flexibility and the extensibility of the present invention.

Any given page or site can have multiple different entries in the site/page annotation file. For example, the first two entries in the above list are for the same page, but have different tags, the first being a Negative Review, and the second being a Professional Photographer Review, different ranks, and different comments. This allows the vertical content provider to express the relevance of a give site for a particular context, rather than being limited to a single inclusion.

Knowledge Base

A second mechanism for capturing the knowledge and expertise of the vertical content provider is the knowledge base file 904. The knowledge base file 904 is used to describe specific knowledge of concepts, facts, events, persons, and like. This information is encoded in a graph of object classes and instances thereof. A simple knowledge base file 904 could be as follows:

```
<KB>
    <Class id="CameraModel"/>
    <Class id="DigitalSLRCamera">
        <subClassOf ref="CameraModel"/>
    </Class>
    <DigitalSLRCamera id="NikonD100">
        <manufacturedIn ref="Japan"/>
        <name>D100</name>
        <name>Nikon D100</name>
        <manufacturer>Nikon</manufacturer>
        <brand>Nikon</brand>
        <format>SLR</format>
        <madein>Japan</madein>
        <modelyear>2003</modelyear>
        <megaPixels>6mp</megaPixels>
    </DigitalSLRCamera>
    <DigitalSLRCamera id="CanonDigitalRebel">
```

-continued

```
        <manufacturedIn ref="Japan"/>
        <name>EOS300D</name>
        <name>Digital Rebel</name>
        <manufacturer>Canon</manufacturer>
        <brand>Canon</brand>
        <format>SLR</format>
        <madein>Japan</madein>
        <modelyear>2003</modelyear>
        <megaPixels>6.5mp</megaPixels>
    </DigitalSLRCamera>
</KB>
```

This knowledge base defines the class of "CameraModel", used to identify individual types of cameras. Each class had a class id, as shown. A class can then be a subclass of another class. Hence, the class "DigitalSLRCamera" is a subclass of the "CameraModel" class.

Instances of a class can then be defined as well. Here, two different instances of the class "DigitalSLRCamera" are defined by giving it a specific id, here "NikonD100" and "CanonDigitalRebel", and a listing of a variety of properties, such as their name, manufacturer, location of manufacture, model year, and so forth. The properties for each class are determined by the provider of the knowledge base file 904, such as the vertical content provider.

The programmable search engine may maintain its own global knowledge base file as part of its global context files. This global knowledge base can provide an extensive database encapsulating a vast array of knowledge, concepts, facts, and so forth, as extracted from content on the Internet, provided by experts or editors, or any taken from existing databases. Vertical content providers can then make use of this global knowledge base by providing preprocessing and post processing operations that make use of such knowledge base information, as further described below.

Pre-Processing and Post Processing Context Processing Operations

The context files 902 use a script or markup language to define the various pre-processing, search engine control, and post-processing operations. The various elements of the language are as follows:

(i) Object Evaluation

The knowledge base file 904 can be used to evaluate whether particular objects have defined properties or attributes. In general, there are three basic types of objects that can be evaluated related to the knowledge base: queries, users, and search results. The form of the evaluation commands are generally the same.

The query evaluation commands for evaluating terms using the knowledge base file 904 are as follows:

```
<query.denot.property>property_value</query.denot.property>
<query.denot.InstanceOf>class_id</query.denot.InstanceOf>
<query>query_term</query>
```

The first type of term based evaluation is used to evaluate whether the concept expressed by one or more query terms matches some object in the knowledge base file that has the specified property with the specified property_value. The context processor processes this command by traversing the knowledge base file 904 (as a graph, for example) until it finds an object having a property with the matching property value.

For example, assume the knowledge base file 904 portion described above, and the query evaluation command:

<query.denot.Manufacturer>Nikon</query.denot.Manufacturer> and the input search query "D100".

Here, the query term "D100" matches the name of a camera instance in the knowledge base file 904. The context processor than checks whether the Manufacturer property of that instance is "Nikon". Since it is, the query "D100" is said to denote a camera manufactured by Nikon, even if that is not specifically disclosed in the query term itself. Accordingly the query evaluation command is satisfied, and the context processor would then take an appropriate action that was dependent on this evaluation. As will be further illustrated below, a variety of different commands to the context processor can be made conditional based on the evaluation of the query evaluation command.

The second type of query evaluation command is query.denot.InstanceOf. This command is evaluated to determine whether a particular query indicates that an instance of a class has been described in the query, rather than property. For example, consider the query evaluation command:

<query.denot.InstanceOf>DigitalSLRCamera</query.denot> where the user query is "8 mp SLR".

Here, the query is decomposed into terms "8 mp" and "SLR", and these are checked against the property values for the objects in the knowledge base file. In this example, these properties match the properties for the Nikon D100 camera, satisfying the query evaluation command. Again, the context processor would undertake whatever command was conditioned on the evaluation command.

The last type of query evaluation command <query>query_term</query> is the simplest. The query evaluation command is satisfied if an input search query term matches the query_term.

As noted above, the context files may use combination of query evaluation commands as conditional triggers for further context processing. Example of these will be further described below.

As with the evaluation of queries, so too can users and search results be evaluated for their properties, with respect to any defined class in the knowledge base file. Thus, the attributes of user can be evaluated with the following command <user.property>property_value</user.property> where property refers to any available property of the user, such as user name, login, account number, location, IP address, site activity and history (e.g., clicks, focus, page dwell time) and so forth. Some of these properties can be locally available from the knowledge base file 904. Alternatively, the property information can be extracted (e.g., queried) from any accessible legacy database (e.g., a customer database, account database, registration database, or other data source), which exports an appropriate programmatic interface. Other properties, such as site activity, are made available from site tracking tools that monitor each user's activity at the vertical content site.

Users can also be evaluated for membership in classes, using the following:

<user.InstanceOf>class_id</user.instanceOf>

Here, a class of users (e.g., "Professional") can be defined in the knowledge base file 904, and the properties of the current user compared by the context processor against properties of an identified class for match in values. If a property match is found, the user is deemed a member of the class.

Similarly, any search result can be evaluated as well, as to its properties, as defined in either the source/page annotation file 900 (or alternatively, in its metatags). Here, the evaluation command would take the form:

```
<result.tag>tag_value</result.tag>
<result.tag.InstanceOf>class_id</result.tag.InstanceOf>
```

As a default <result.tag> may be abbreviated to <tag>.

In the first command, a given search result (or set thereof) can be evaluated with respect to its properties, such as content type, date, source, user type, etc. This outcome of the evaluation can be used to control further context processing. Similarly, search results can be evaluated using the second command syntax to determine if they are instances of various classes defined in the knowledge base file 904.

These following context processing operations can be executed unconditionally, or conditionally based on any of the foregoing types of evaluation operations (e.g., evaluations of query terms, users, or search results).

(ii) Query Modification

There are two basic types of query modification rules, those that augment or add terms to a query, and those that replace query terms. The following is example syntax for the query modifier command:

```
<QueryModifier type="augment" value="query term"/>
<QueryModifier type="replace" query="query term"
    value="replacement term"/>
```

The type attribute defines either an augmentation or replacement type query modification. The value attribute includes the query term that is to be added to the user's original input search query, or that is to replace the input search query. The query attribute is optional. If present, then the context processor scans the search query and replaces the any term matching the query term with the replacement term. This is useful, for example, to correct misspellings, expand abbreviations (or contrawise use abbreviations in place of terms), and other in place adjustments. If the query attribute is missing, then the entry query string is replaced by the replacement term. Of course, the replacement term can include any number of terms.

Query modification can made conditional on any of the evaluation commands. For example:

```
<QueryModifier type="augment" value="Digital SLR">
    <query.denot.InstanceOf>DigitalSLRCamera</query.denot>
</QueryModifer>
```

This example would reformulate a query, say the query "D100" to include another query "Digital SLR" since the term "D100" denotes an instance of a digital SLR camera, according to the knowledge base file 904.

As another example:

```
<QueryModifier type="augment" value="Professional reviews">
    <user.property>professional</user.property>
</QueryModifer>
```

In this example, assume again the user's query is "D100." Here, the properties of the current user are evaluated. If the user is determined to be "professional", based on properties available from the browser, site activity history, login and password, etc. For example, if the user access a number of pages in the vertical content site dedicated to professional or expert level information (e.g., detailed technical pages), then the user may be inferred to be a "professional" user, even though no other information is known about the user's identity. In this case, the query is reformulated to include the term "professional reviews" even though the user did not include these terms in the query.

These are but a few examples of a how a vertical content provider can extend and improve the user's queries based on his own expertise and the flexible context processing operations.

(iii) References to Related Contexts

A context file 902 can reference or include another context file 902, as described above, to form an arbitrary graph of connections. Several elements are used for referencing context files.

A context file can include another context file, as follows:

<include scr="path name">.

The include command references another context file 902 as being included in the current context file. The context processor will read the included context file and process all of the instructions therein. Pathname identifies the location of included context file 902. Included context files 902 can be used for any type of context processing operation.

A context file can also identify a related context file, as follows:

```
<relContext href="path name">
    <anchorText>context description<anchorText>
</relContext>
and
<relContext href="path name">context
description</relContext>
```

The relContext command identifies a related context for the current context file. The relContext command can be used in both pre-processing and post-processing operations. Examples of the use of related contexts in post-processing operations are illustrated in FIG. 9, and in FIGS. 2 and 3. The context description is anchor text that the user will see in the browser. When selected, the identified related context file is retrieved and processed. The first type of related context command is used to define related contexts for varying types of information needs. FIG. 2 illustrates this type of related context via related context links 204. The first link 204 there is associated with a related context file 902 (e.g., context file 902*h*) that includes the following instructions:

```
<relContext href=" /chooseCamera">
    <anchorText>If you are trying to decide which camera
    to buy ... </anchorText>
</relContext>
```

This command is processed by the context processor when the link 204 on the anchor text is selected, and the corresponding context file "cameras/chooseCamera" is retrieved and processed. The resulting page is illustrated in FIG. 3.

The relContext command may also be used with the various types of evaluation commands, to make the reference to the related context conditional. For example:

```
<relContext href=" /chooseCamera">
    <query.denot.instanceOf>DigitalSLRCamera</query.denot
    .instanceOf>
    <anchorText>If you are trying to decide which camera
to buy . . . </anchorText>
</relContext>
```

Here, the related context DigitalSLRCamera is accessed here only if the query.denote command evaluates true, that is where the query terms denote an instance of a model of digital camera listed in the knowledge base file 904. Similar conditional evaluations can be based on the properties of the user or the properties of the search results.

The second type of related context command is used to define related contexts that appear as annotations in conjunction with search results. This type of related context is illustrated in FIG. 2 by related context links 206. For example, the related context file 902h that generated FIG. 2 also includes the following instructions:

```
<relContext href="cameras/Manufacturer">More Manufacturer
Pages</relContext>
```

Here, the anchor text "More Manufacturer Pages" is then linked to the associated context file 902, which contains further instructions to searching and displaying pages for digital camera manufacturers.

The relContext command takes as an href any valid URL, and thus, can also reference any available Internet site. For example, the relContext command can directly link to an online encyclopedia or dictionary to provide an annotation for a search result that would provide a detailed explanation of the result.

In pre-processing operations, a second type of cross reference to related context is used, context redirection. The command format for the context redirection command is as follows:

```
<contextRedirect href="pathname">redirection
    condition*</contextRedirect>
```

Again, pathname indicates the location of another context file to be processed if certain redirection conditions are met. The redirection conditions (one or more as indicated by "*") can be based on any available information about the query (e.g., query terms, or information dependent thereon), the user (e.g., IP address, login, site click through history, prior purchases), or other programmatically available information.

In one embodiment the redirection conditions can be based on the any evaluation commands previously discussed:

```
<query.denot.property>property_value</query.denot.property>
<query.denot.InstanceOf>class_id</query.denot.InstanceOf>
<query>query_term</query>
<user.property>property_value</user.property>
<user.InstanceOf>class_id</user.instanceOf>
```

-continued

```
<result.tag>tag_value</result.tag>
<result.tag.InstanceOf>class_id</result.tag.InstanceOf>
```

For example, assume the knowledge base file 904 portion described above. Further, assume the redirection command:

```
<contextRedirect href="Nikon_cameras">
    <query.denot.Manufacturer>Nikon</query.denot.Manufact
urer>
</contextRedirect>
``` and the input search query "D100".

As above, the query evaluation command is positively evaluated, since the query term "D100" matches the name of a camera instance in the knowledge base file 904, which instance has the Manufacturer property value "Nikon". The context processor thus executes the context redirection command and accesses the context file "Nikon_cameras" for further processing. This capability allows the vertical content provider to his or her own knowledge base to analyze queries and reformulate them on behalf of the user.

The user evaluation user.InstanceOf can likewise be used to redirect context processing based on the particular user properties. For example, consider the redirection command:

```
<contextRedirect href="NegativeProfessionalReviews">
    <user.InstanceOf>Professional_User</user.InstanceOf>
</contextRedirect>
```

Here, the properties of the user can be ascertained from the knowledge base file 904, and other information as described (e.g., site history). If the user is determined to be a professional user, then the context processor accesses and processes the NegativeProfessionalReviews context file.

As mentioned, any number of redirection conditions (e.g. evaluations) can be used together in a context redirection command such as:

```
<contextRedirect href="Recommended_SLR_cameras">
    <query.denot.megapixels>6mp</query.denot.megapixels>
    <query.denot.megapixels
matchType="greaterThanOrEqualTo">6mp</query.denot.megapixel
s>
    <query.denot.megapixels
matchType="lessThanOrEqualTo">8mp</query.denot.megapixels>
    <query.denot.modelyear>2005</query.denot.modelyear>
</contextRedirect>
``` which would effect the context redirection only when all of the redirection conditions are satisfied, e.g., for a query containing the terms which denote digital SLR with between 6 mp and 8 mp, for the 2005 model year.

The context redirection is particularly powerful when combined with the query modification rules, previously discussed. A vertical content provider can define a number of context redirections based on query terms, each of redirects the context processor to an appropriate context file, depending on say, whether the query denotes shopping for a camera versus seeking customer warranty information. In the respective target context files, specific query modification rules would then be processed to reformulate the query as most appropriate given the identified context.

(iv) Restriction

In post processing operations, the context files can be used to control the scope, number, or types of results and entries that are provided to the user. To this end, the context files can include conditional instructions that define various types of restrictions (e.g., filters). These restrictions are provided by the restriction command. This command has the following syntax:

```
<Restriction count="n">
    restriction condition*
    restriction action*
</Restriction>
```

The restriction condition operates in a similar manner to the redirection condition previously discussed. Here, the restriction condition is evaluated with respect to the attributes (tags), if any, associated with the search results, as compared to the entries in the site/page annotation file. Any attribute (or set of attributes) can be used as restriction conditions, such as the type, source, year, location, of a document or page, to name but a few. The context processor receives the search results (here a set of candidate search results) from the search engine, and compares each candidate result (be it a site, page, media page, document, etc.) with the entries listed in the site/page annotation file 900. Only those candidate results which are listed in the annotation file 904 and have the specified matching attributes are included in the context processed search results. The restriction count is an optional parameter and indicates how many of the matching results are to be included in the context processed search results. If left out, then all matching results are included.

The restriction action is an optional parameter that specifies a further action to take if the restriction condition is met. This action includes, for example, annotating the search results with a link to a related context (using the relContext command), such as links 206 illustrated in FIG. 2.

Consider the following example:

```
<Restriction count="2">
    <descriptor>Review</descriptor>
    <rank>5+</rank>
    <relContext href="Reviews">More Review</relContext>
</Restriction>
<Restriction count="2">
    <descriptor>Guide</descriptor>
    <rank>5+</rank>
    <relContext href="Guides">More Guides</relContext>
</Restriction>
```

Assume that the search query was a general query on "digital cameras", and that the search results returned 1,000,000 pages covering everything from manufacturers and retailers of digital cameras, to online user forums and services for printing photographs. Since the user's search was quite general, the vertical content provider can use the post processing to provide a selection of a number of different types of search results, as illustrated, for example in FIG. 2. In processing the above code example then, the first restriction command causes the context processor to select the first two search results that have matching entries (i.e., matching URLs or portions thereof) in the site/page annotation file 900 and include the descriptor "Review". The context processor also uses the restriction action for the related context, to annotate these two search results with a link to related context file "Reviews", with the link labeled "More reviews." FIG. 2 shows an example of such annotation link 206.

The second restriction causes the context processor to select the first two search results that have matching entries in the site/page annotation file and include the descriptor "Guide." The context processor would then use the restriction action to annotate these results with a link to the related context file "Guides."

As mentioned previously, the context processing operations can undertaken by multiple different entities in the system, including at the client device, the vertical content site, and the programmable search engine, each using their own locally available context files. Thus, all of the above describe features can be effectively integrated within and between different system entities. For example, a vertical context provider can define a context file that defines various context redirections using the redirection condition based on the global knowledge base files. This enables the vertical content provider to leverage the global knowledge base, but add their own personal perspective and judgment to its underlying facts.

In post processing operations, the context file 900 can be used to control just the annotations that appear on a search result, without changing the actual order of the search results. To this end, the context files 900 can include conditional instructions that define various types of annotations. These annotations are provided by the annotate command. This command has the following syntax:

```
<Annotate count="n">
    annotation condition*
    annotation action*
</Annotation>
```

The annotation condition operates in a similar manner to the restriction condition previously discussed. Here, the annotation condition is evaluated with respect to the attributes (tags), if any, associated with the search results, as compared to the entries in the site/page annotation file. Any attribute (or set of attributes) can be used as annotation conditions, such as the type, source, year, location, of a document or page, to name but a few. The context processor receives the search results from the search engine, and compares each result (be it a site, page, media page, document, etc.) with the entries listed in the site/page annotation file 900. Results that satisfy the condition are annotated with the annotation action. Unlike the Restriction command, the Annotate command does not cause any search result to appear or not appear in the search results. Annotate commands can be used by themselves or in combination with any of the other commands, including Restrictions.

In a very simple implementation, the context file is left implicit and only consists of Annotation commands, where each result that is assigned a tag/label/annotation by the annotation files is annotated with that label/annotation. Further, the user may be 'subscribed' to a number of annotation files or 'feeds', all of which are applied to the user's search results. In a further twist, the user can also indicate that he would like the feeds used by another user to also be applied to him.

(v) Search Engine Control Data

Finally, context files 902 can contain instructions that control the operation of the programmable search engine itself in terms the selection of which particular document collections to be searched, and various algorithmic or parametric settings for the search engine. Selection of a document collection for searching is provided by the following command:

```
<Corpus ref="document_collection">
    //other context operations//
</Corpus>
```

The corpus command takes as its argument a reference to the name (or ULR) or a selected document collection. The document collection name is mapped (either locally, or by the programmable search engine) to document collection and corresponding index available to the programmable search engine (e.g. particular index in the content server/index 870).

The corpus command can be made conditional using any of the foregoing described evaluation commands, as well as including any of the restriction, redirection, related context, and so forth. For example, a particular document collection may be selected where the query is determined using the evaluation commands to include certain keywords or instances of objects in the knowledge base. Thus, a query that is evaluated to include a query term denoting a scientific term, like "Heloderma suspectum", or a medical term, would then cause a selection of an appropriate scientific literature database.

Control of search engine parameters is via the SearchControlParams operations. In general, most modern search engines use a number of different attributes of a search query and the individual indexed documents (e.g., frequencies of terms in URL, anchor text, body, page rank etc.) to determine which documents best satisfy the query. The documents are then ranked accordingly. A ranking function is essentially a weighted combination of the various attributes. Normally, the weights of the attributes are fixed, or at least not externally controllable by third parties. The SearchControlParam however gives vertical content providers access to these weights. The syntax is as follows:

```
<SearchControlParams>
    <attribute-name>weight</attribute-name>
    <attribute-name>weight</attribute-name>
    ...
</SearchControlParams>
```

Here, attribute-name is the name of the particular attribute used by the search engine to calculate a relevance ranking. The specific attribute names are disclosed by the programmable search engine provider, since they are internal to that provider's own engine. Typical attributes, as indicated above including term frequency in URL, term frequency in body, term frequency in anchor text, term frequency in markup, page rank. The SearchControlParams operator can work with any exposed attribute or parametric control of a programmable search engine, and thus the foregoing are understood to be merely exemplary. The weights used in this operator can be either normalized or non-normalized, and in the latter case, the input weights can be internally normalized by the context processor or by the search engine itself. A vertical content provider need not specify weights for all the attributes the search engine uses, but only those of interest to the provider of the context file.

The context files may take various embodiments. In the some embodiments, the context files are individual files stored in a file system. In other embodiments, the context files are stored in a database system, again as either separate files, or of database entries, tables or other structures. For example, a context file in database embodiment may be stored as a collection of context records for a identified source (e.g., a specific vertical content provider), a type (e.g., knowledge base, site/page annotation, etc.), associated commands (e.g., evaluation, restriction, redirection, relation, annotation, etc.), and remaining attributes and conditions. Accordingly, no limitation is imposed on the underlying implementation of the context files by the present invention.

Detecting Biased Contexts

As described above in connection with FIG. 8, the PSE system 800 provides context processing for queries directly received from client devices, that is, queries that are not forwarded via a search engine interface from a vertical content provider. In handling such queries, the PSE system 800 makes use of the global context files 842, and can also use the cached context files 840 as a source of global context information, for example to annotate results, provide links to related contexts or other sites, and to restrict search results to particular groups. Because the global context files 842 can derive context processing operations from the cached context files, it is expected that some third parties will attempt to manipulate the PSE system 800 to provide biased or "spam" type results to user's queries.

For example, a user searching for "digital cameras reviews" may receive a set of search results that include links (e.g., such as related context links 306) to related contexts provided by third parties such as reviews and other technical information. However, the provider of the context files may program its links 306 to include links to certain product vendors (e.g., those who have paid for such inclusion), using any variety of the query modification commands (e.g., replacing the "digital camera reviews" query with the name of the vendor), related context commands, or redirection commands. As a result, when the user accesses the related context links 306, the user receives "spam results". While such results may be desirable when the user's query is provided from a vertical content provider site, it is desirable to detect such biased contexts when the user is accessing the PSE system 800 directly and thereby prevent unscrupulous spamming of user queries.

A number of different mechanisms can be used individually or together to detect biased and spam related context files and vertical content providers. These include the following.

Figure 10:
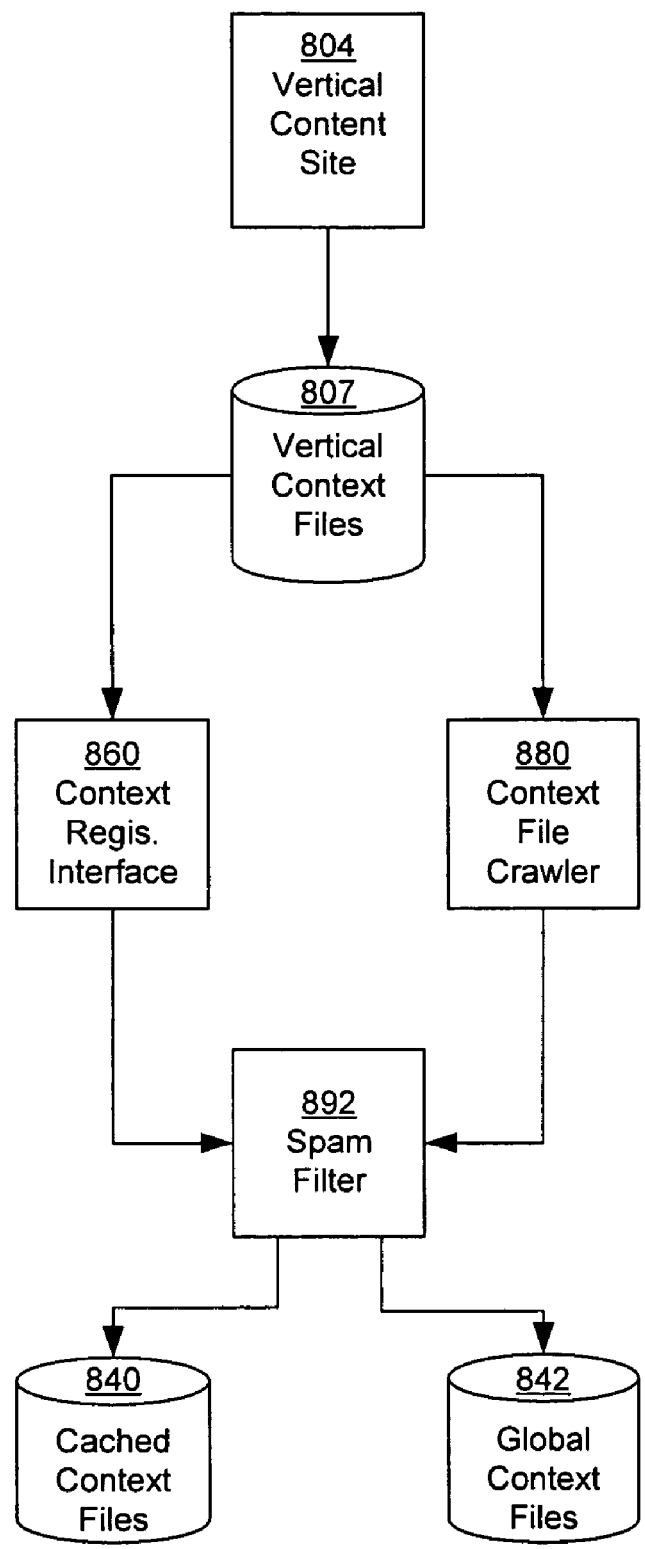
FIG. 10 illustrates offline spam filtering of context files.

First, an offline analysis of the context files obtained from each vertical content provider is performed to identify sites or pages known to be spam-related. FIG. 10 illustrates the basic processing model for offline analysis. Some content providers will use their own site/page annotation file 800 when defining pre-processing or post processing operations, for example for annotating links 306 next to search results or defining restrictions operations. Other content providers will use a third parties site/page annotation file 800 (that is, one located in a different host system).

Accordingly, each a site/page annotation file received from a vertical content provider 804 (whether by crawling from context file crawler 880 or by registration interface 860) is processed with a spam filter 892. The spam filter 892 analyzes each of the pages listed in the annotation file to determine whether the page is a spam page. The spam filter 892 may be dynamic (e.g., algorithmic determination of spam from content analysis) or static (e.g., comparison of the page with a list of known spam pages). Spam filter that may be used here include those described in U.S. patent applications Ser. Nos.

10/921,381 and 11/004,250, incorporated by reference above. If a significant portion (e.g., more than 40%) of the pages listed in a site/page annotation file of a particular vertical content provider is determined by the spam filter to be spam, then one of two actions can be taken. First, if the site/page annotation file is provided by the vertical content provider itself, then this vertical content provider is deemed a biased vertical content provider, and its context files are not used for further direct context processing as part of the global context files 842. As a result, search results from direct queries to the PSE system will not include links, annotation, or other content from this particular vertical content provider. Alternatively, if the site/page annotation file is source from another domain, then instead the specific documents deemed to be spam are stripped during post-processing from search results or links provided by this context file.

This first stage of offline processing thus operates to detect and eliminate vertical content providers and/or context files that are known to be spam related.

Figure 11:
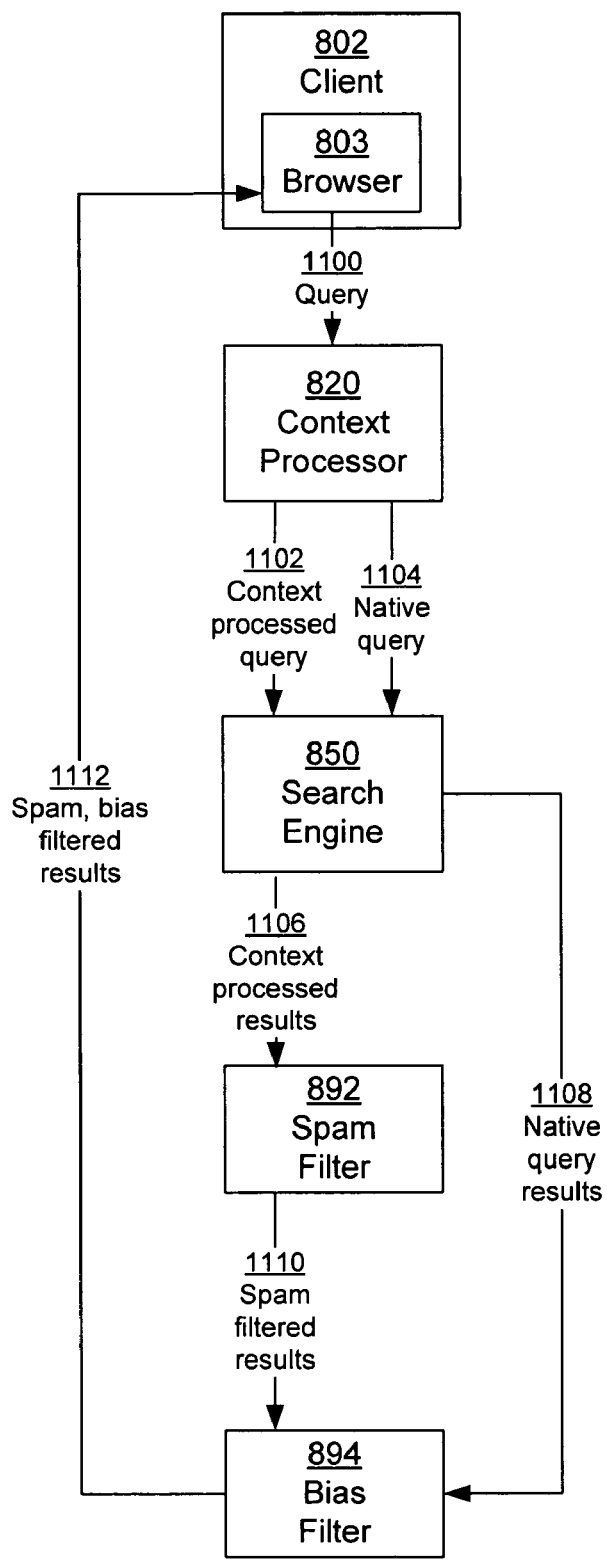
FIG. 11 illustrates query time filtering of context files.

A second stage is spam and bias detection during direct query processing. FIG. 11 illustrates the basic processing model for query time analysis. In some embodiments, it is beneficial to distinguish between spam related results (and contexts) and biased results (and contexts). Spam results may be characterized (without limitation) as commercially influenced communications that are not reflective of the user's actual interests; biased results may be characterized (again, without limitation) as being sufficiently different in content from search results produced by objective search models.

Accordingly, in one aspect of query processing, spam-related context files are identified, particularly those that include query modification commands that result in a spam query, and hence heavily spam oriented search results. Here, the query 1100 is received from the client device 802, and context processing is applied. The search engine 850 executes the search on the context processed query 1102, as described above. Some portion of the search results 1106 resulting from context processing using a particular vertical content provider's context files are processed with a spam filter 892 to determine an average spam score for the context processed search results 1106. For example, the top 10% or top 1,000 search results can be processed with a spam filter 892. In one embodiment, an average spam score is computed by the spam filter 892 from the spam score of such search result. If the average spam score is over a predetermined threshold (dependent on the particular spam filter), then the vertical content provider is identified as a spam content provider. In another embodiment, the percentage of search results determined to be spam is compared with a predetermined threshold (e.g., 40%) and if this percentage exceeds the threshold then the vertical content provider is again identified as a spam content provider. In either embodiment, the spam search results, as well links, annotations, or other context related content from the vertical content provider's context files are not included in the filtered results 1112.

In the second aspect of query processing, biased search results are identified. Here, bias results are those that are not necessarily spam results, but rather are sufficiently different from non-context processed search results that the vertical content provider is deemed to be biased in its manipulation of the context files.

In this second aspect, the search results resulting from the context processed query 1106 are compared by a bias detection algorithm 894 with the search results 1108 from the original (or native) search query 1104 to determine a distance measure between the two sets of the search results. The native search results are assumed to be unbiased and being most relevant to the original search query. If the two sets of search results are identical, then the distance between the result sets is zero, and the provider of the context files is deemed to be unbiased. However, if the distance measure between the two sets of search results is significant (e.g., over threshold amount), the vertical content provider is deemed biased. In this case, the provider's context files are not used in post-processing, and thus the filtered results 1112 will not include any links, annotations, or other context related contents from the provider.

The distance measure for measuring the distance between the native and context processed search results can be any number of set comparison measures. One distance measure is the percentage of context processed search results that are the same as native search results. Variations in the required degree of sameness can be used, resulting in different distance measures. Thus, the sameness criteria can be flexibly defined to range from being the same identical documents/pages, to being from the same host site, to being different versions of the same document/page on the same or different sites.

Other variations of the spam detection at query processing may also be used. In one embodiment, instead of comparing the average spam score with a predetermined threshold, the average spam score is instead compared with an average spam score of the search results from a native (non-context processed) search. If the average spam score for the context processed search results is significantly higher than the native spam score, then the context file is deemed biased, and is not used for post processing the search results.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "calculating" or "determining" or "identifying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention have been described using commands, mnemonics, tokens, formats, syntax, and other programming conventions. The particular selection of the names, formats, syntax, and like are merely illustrative, and not limiting. Those of skill in the art can readily construct alterative names, formats, syntax rules, and so forth for defining context files and programming the operations a programmable search engine via context processing.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with to any particular programming language. It is appreciated that a variety of programming languages may be used to implement the teaching of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

I claim:

1. A computer-implemented method, comprising:
maintaining in a data processing system a collection of context files for use by a search engine system, each context file provided by a third-party content provider to the search engine system, each context file containing commands to control operation of the search engine system in processing search query inputs;
receiving from a plurality of third-party content providers a plurality of new context files for addition to the collection, each of the providers providing at least one of the new context files, each new context file provided by the respective third-party content provider to the search engine system each new context file containing commands to control operation of the search engine system in processing search query inputs;
for a first new context file, determining that a number of spam web pages listed in the first new context file exceeds a threshold number and consequently not adding the first new context file to the collection;
receiving in a search engine a search query input from a user, the search query input having been received through an interface provided to the user by the third-party content provider;
identifying a first context file from the collection for processing the search query input;
using commands in the first context file to control an organization and a presentation of search results resulting from the processing of the search query input, including:
processing the search query input using the commands in the first context file to produce a context processed search query;
generating context processed search results responsive to the context processed search query; and
providing the context processed search results in accordance with the commands in the first context file, wherein the identifying, processing, generating and providing are performed by one or more processors.

2. The method of claim 1, wherein at least one context file in the collection includes links to related context files.

3. The method of claim 1, further comprising:
executing at least one command from the first context file, the command selected from a group of commands comprising:
a query evaluation command for evaluating a property value of a query with respect to a predefined property;
a query modification command for modifying the search query input;
a related context command for identifying a related context file in the context processed search results; and
a redirection command for identifying a related context file for processing.

4. The method of claim 1, further comprising:
executing at least one command from the first context file, the command selected from a group of commands comprising:
a corpus selection command for selecting a document collection for searching with the search query input; and
a search engine parameter command for establishing a parameter of a search engine for processing the search query input.

5. The method of claim 1, further comprising:
executing at least one command from the first context file, the command selected from a group of commands comprising:
a restriction command for filtering the search results to include only search results of a designated type in the context processed search results; and
an annotation command for annotating the context processed search results.

6. The method of claim 1, wherein the context processed search results are presented with annotations specified in the first context file.

7. The method of claim 6, wherein the annotations comprise links to web pages.

8. The method of claim 6, wherein the annotations comprise labels, further comprising:
receiving a selection of one of the labels; and
generating new search results, wherein the new search results are associated with metadata that include the label.

9. A computer-implemented method, comprising:
receiving in a search engine a search query input from a user, the search query input having been input received through an interface provided to the user by a third-party content provider;
identifying a context file provided by the third-party content provider, the context file containing commands for processing the search query input;
using the commands in the context file to control an organization and a presentation of search results resulting from the processing of the search query input, including:
processing the search query input using the commands in the context file to produce a context processed search query;
generating context processed search results responsive to the context processed search query;
determining that a spam measure of the context processed search results exceeds a spam threshold; and
excluding spam search results, links, annotations, or other context related content included in the context file from the context processed search results and providing the resulting context processed search results in accordance with the commands in the context file, wherein the identifying, processing, generating and excluding are performed by one or more processors.

10. The method of claim 9, wherein the context file includes links to related context files.

11. The method of claim 9, further comprising: executing at least one command from the context file, the command selected from a group of commands comprising:
a query evaluation command for evaluating a property value of a query with respect to a predefined property;
a query modification command for modifying the search query input;
a related context command for identifying a related context file in the context processed search results; and
a redirection command for identifying a related context file for processing.

12. A computer-implemented method comprising:
receiving in a search engine a search query input from a user through an interface provided to the user by a third-party content provider;
identifying a context file provided by the third-party content provider, the context file containing commands for processing the search query input;
using the commands in the context file to control an organization and a presentation of search results resulting from the processing of the search query input, including:
processing the search query input using the commands in the context file to produce a context processed search query;
generating context processed search results responsive to the context processed search query;
generating native processed search results responsive to the search query input;
calculating a distance measure between the context processed search results and the native processed search results;
determining that the distance measure exceeds a distance threshold and consequently removing, from the context processed search results, context processed search results that are not found in the native search results to produce filtered context processed search results; and
providing the filtered context processed search results in response to the search query input, wherein the identifying, processing, and providing are performed by one or more processors.

13. The method of claim 12, wherein the distance measure is a percentage of the context processed search results that are included in the native search results.

14. A system comprising:
one or more computers;
a computer-readable medium coupled to the one or more computers having instructions stored thereon executable by the one or more computers to cause the one or more computers to perform operations comprising:
maintaining in a data processing system a collection of context files for use by a search engine system, each context file provided by a third-party content provider to the search engine system, each context file containing commands to control operation of the search engine system in processing search query inputs;
receiving from a plurality of third-party content providers a plurality of new context files for addition to the collection, each of the providers providing at least one of the new context files, each new context file provided by the respective third-party content provider to the search engine system, each new context file containing commands to control operation of the search engine system in processing search query inputs;
for a first new context file, determining that the number of spam web pages listed in the first new context file exceeds a threshold number and consequently not adding the first new context file to the collection;
receiving in a search engine a search query input from a user, the search query input having been received through an interface provided to the user by the third-party content provider;
identifying a first context file from the collection for processing the search query input;
using commands in the first context file to control an organization and a presentation of search results resulting from the processing of the search query input, including:
processing the search query input using the commands in the first context file to produce a context processed search query;
generating context processed search results responsive to the context processed search query; and
providing the context processed search results in accordance with the commands in the first context file.

15. A system comprising:
one or more computers;
a computer-readable medium coupled to the one or more computers having instructions stored thereon executable by the one or more computers to cause the one or more computers to perform operations comprising:
receiving in a search engine a search query input from a user, the search query input having been input received through an interface provided to the user by a third-party content provider;
identifying a context file provided by the third-party content provider, the context file containing commands for processing the search query input;
using the commands in the context file to control an organization and a presentation of search results resulting from the processing of the search query input, including:
processing the search query input using the commands in the context file to produce a context processed search query;

generating context processed search results responsive to the context processed search query;

determining that a spam measure of the context processed search results exceeds a spam threshold;

including context content in the context processed search results provided to the user if the spam measure does not exceed the spam threshold; and excluding spam search results, links, annotations, or other context related content included in the context file from the context processed search results and providing the resulting context processed search results in accordance with the commands in the context file.

16. The system of claim 15, wherein the operations further comprise:

transmitting the search results to a client device.

17. A system comprising:

one or more computers;

a computer-readable medium coupled to the one or more computers having instructions stored thereon executable by the one or more computers to cause the one or more computers to perform operations comprising:

receiving in a search engine a search query input from a user through an interface provided to the user by a third-party content provider;

identifying a context file provided by the third-party content provider, the context file containing commands for processing the search query input;

using the commands in the context file to control an organization and a presentation of search results resulting from the processing of the search query input, including:

processing the search query input using the commands in the context file to produce a context processed search query;

generating context processed search results responsive to the context processed search query;

generating native processed search results responsive to the search query input;

calculating a distance measure between the context processed search results and the native processed search results;

determining that the distance measure exceeds a distance threshold and consequently removing, from the context processed search results, context processed search results that are not found in the native search results to produce filtered context processed search results; and providing the filtered context processed search results in response to the search query input.

18. The system of claim 17, wherein the operations further comprise:

transmitting the filtered context processed search results to a client device.

19. A computer-readable medium encoded with a computer program, the computer program comprising instructions that, when executed, operate to cause a computer to perform operations comprising:

maintaining in a data processing system a collection of context files for use by a search engine system, each context file provided by a third-party content provider to the search engine system, each context file containing commands to control operation of the search engine system in processing search query inputs;

receiving from a plurality of third-party content providers a plurality of new context files for addition to the collection, each of the providers providing at least one of the new context files, each new context file provided by the respective third-party content provider to the search engine system each new context file containing commands to control operation of the search engine system in processing search query inputs;

for a first new context file, determining that a number of spam web pages listed in the first new context file exceeds a threshold number and consequently not adding the first new context file to the collection;

receiving in a search engine a search query input from a user, the search query input having been received through an interface provided to the user by the third-party content provider;

identifying a first context file from the collection for processing the search query input;

using commands in the first context file to control an organization and a presentation of search results resulting from the processing of the search query input, including:

processing the search query input using the commands in the first context file to produce a context processed search query;

generating context processed search results responsive to the context processed search query; and providing the context processed search results in accordance with the commands in the first context file, wherein the identifying, processing, generating and providing are performed by one or more processors.

20. A computer-readable medium encoded with a computer program, the computer program comprising instructions that, when executed, operate to cause a computer to perform operations comprising:

receiving in a search engine a search query input from a user, the search query input having been input received through an interface provided to the user by a third-party content provider;

identifying a context file provided by the third-party content provider, the context file containing commands for processing the search query input;

using the commands in the context file to control an organization and a presentation of search results resulting from the processing of the search query input, including:

processing the search query input using the commands in the context file to produce a context processed search query;

generating context processed search results responsive to the context processed search query;

determining that a spam measure of the context processed search results exceeds a spam threshold; and excluding spam search results, links, annotations, or other context related content included in the context file from the context processed search results and providing the resulting context processed search results in accordance with the commands in the context file, wherein the identifying, processing, generating and excluding are performed by one or more processors.

21. A computer-readable medium encoded with a computer program, the computer program comprising instructions that, when executed, operate to cause a computer to perform operations comprising:

receiving in a search engine a search query input from a user through an interface provided to the user by a third-party content provider;

identifying a context file provided by the third-party content provider, the context file containing commands for processing the search query input;

using the commands in the context file to control an organization and a presentation of search results resulting from the processing of the search query input, including:

processing the search query input using the commands in the context file to produce a context processed search query;

generating context processed search results responsive to the context processed search query;

generating native processed search results responsive to the search query input;

calculating a distance measure between the context processed search results and the native processed search results;

determining that the distance measure exceeds a distance threshold and consequently removing, from the context processed search results, context processed search results that are not found in the native search results to produce filtered context processed search results; and providing the filtered context processed search results in response to the search query input, wherein the identifying, processing, and providing are performed by one or more processors.

* * * * *